US012609813B2

(12) United States Patent
Mano et al.

(10) Patent No.: US 12,609,813 B2
(45) Date of Patent: Apr. 21, 2026

(54) INFORMATION INTERMEDIARY SYSTEM AND INFORMATION INTERMEDIARY METHOD

(71) Applicant: EVERYSENSE JAPAN, INC., Tokyo (JP)

(72) Inventors: Hiroshi Mano, San Jose, CA (US); Tetsutaro Uehara, Kusatsu (JP)

(73) Assignee: EVERYSENSE JAPAN, INC., Tokyo (JP)

( * ) Notice: Subject to any disclaimer, the term of this patent is extended or adjusted under 35 U.S.C. 154(b) by 292 days.

(21) Appl. No.: 18/283,025

(22) PCT Filed: Mar. 18, 2022

(86) PCT No.: PCT/JP2022/012871
§ 371 (c)(1),
(2) Date: Sep. 20, 2023

(87) PCT Pub. No.: WO2022/202719
PCT Pub. Date: Sep. 29, 2022

(65) Prior Publication Data
US 2024/0171379 A1 May 23, 2024

(30) Foreign Application Priority Data

Mar. 22, 2021 (JP) ................................. 2021-047640
Feb. 9, 2022 (JP) ................................. 2022-018715

(51) Int. Cl.
*H04L 29/06* (2006.01)
*G06F 21/64* (2013.01)
(Continued)

(52) U.S. Cl.
CPC ............ *H04L 9/0825* (2013.01); *G06F 21/64* (2013.01); *H04L 9/3236* (2013.01); *H04L 9/3247* (2013.01); *H04L 9/3297* (2013.01)

(58) Field of Classification Search
CPC ... H04L 9/0825; H04L 9/3236; H04L 9/3247; H04L 9/3297; H04L 63/0435;
(Continued)

(56) References Cited

U.S. PATENT DOCUMENTS 7,443,884 B2 10/2008 Shima
2004/0066797 A1 * 4/2004 Shima ................... H04L 63/126
370/465
(Continued)

FOREIGN PATENT DOCUMENTS

CN 104904179 A * 9/2015 ............. G06F 21/83
CN 101416458 B * 7/2019 ........... H04L 63/125
(Continued)

OTHER PUBLICATIONS

May 31, 2022 International Search Report issued in International Patent Application No. PCT/JP2022/012871.
(Continued)

*Primary Examiner* — Sher A Khan
(74) *Attorney, Agent, or Firm* — OLIFF PLC.

(57) ABSTRACT

An information intermediary system, in which a providing-side terminal device, an intermediary device, and a receiving-side terminal device are assigned with first to third public keys and first to third secret keys, the providing-side terminal device generates first encrypted data by encrypting provided data with third public key, and also generates a first electronic signature using the first secret key, and transmits the first encrypted data and the first electronic signature to the intermediary device; the intermediary device generates a second electronic signature using second secret key, and transmits the first encrypted data, the first electronic signature, and the second electronic signature to the receiving-side terminal device; and the receiving-side terminal device decrypts the first encrypted data with the third secret key to
(Continued)

obtain the provided data, and also verifies the first electronic signature with the first public key and verifies the second electronic signature with the second public key.

11 Claims, 18 Drawing Sheets

(51) Int. Cl.
    *H04L 9/08*          (2006.01)
    *H04L 9/32*          (2006.01)

(58) Field of Classification Search
    CPC ........... H04L 63/0442; H04L 2463/121; H04L 63/045; H04L 63/0464; H04L 63/0478; H04L 63/123; H04L 2209/76; H04L 63/126; G06F 21/64; G06F 21/602; G06F 21/606; G06F 21/6209
    See application file for complete search history.

(56) References Cited

U.S. PATENT DOCUMENTS

| | | | | |
|---|---|---|---|---|
| 2004/0221014 | A1* | 11/2004 | Tomkow | H04L 51/23 |
| | | | | 713/176 |
| 2005/0195814 | A1 | 9/2005 | Hagiwara et al. | |
| 2015/0095648 | A1* | 4/2015 | Nix | H04L 63/166 |
| | | | | 713/170 |
| 2017/0063810 | A1* | 3/2017 | Bruce | H04L 63/126 |
| 2019/0074968 | A1* | 3/2019 | Liu | H04L 9/3247 |
| 2019/0180275 | A1* | 6/2019 | Safak | G06Q 20/382 |
| 2020/0313867 | A1* | 10/2020 | Yu | H04L 9/088 |
| 2020/0358788 | A1* | 11/2020 | Lee | H04L 9/0866 |
| 2022/0086000 | A1* | 3/2022 | Munro | H04L 9/0822 |

FOREIGN PATENT DOCUMENTS

| | | | | | | |
|---|---|---|---|---|---|---|
| CN | 106688006 | B | * | 11/2020 | .............. | H04W 4/80 |
| EP | 1 571 790 | A2 | | 9/2005 | | |
| EP | 3361408 | A1 | * | 8/2018 | .......... | H04L 9/0643 |
| JP | H10-336168 | A | | 12/1998 | | |
| JP | 2004-128894 | A | | 4/2004 | | |
| JP | 2005286989 | A | * | 10/2005 | .............. | H04L 45/00 |
| JP | 2007189742 | A | * | 7/2007 | | |
| JP | 2015-82126 | A | | 4/2015 | | |
| JP | 2023060682 | A | * | 4/2023 | | |
| KR | 20200128918 | A | * | 11/2020 | .............. | H04L 9/50 |
| TW | 1546697 | B | * | 8/2016 | | |
| WO | WO-2004049654 | A2 | * | 6/2004 | .............. | H04L 51/08 |
| WO | WO-2018161051 | A1 | * | 9/2018 | .......... | H04L 63/126 |
| WO | 2019/120318 | A2 | | 6/2019 | | |
| WO | WO-2019134868 | A1 | * | 7/2019 | ......... | H04L 63/0478 |
| WO | WO-2019138668 | A1 | * | 7/2019 | .............. | H04L 9/50 |

OTHER PUBLICATIONS

Sep. 30, 2024 Extended European Search Report issued in European Patent Application No. 22775506.3.

\* cited by examiner

FIG. 9

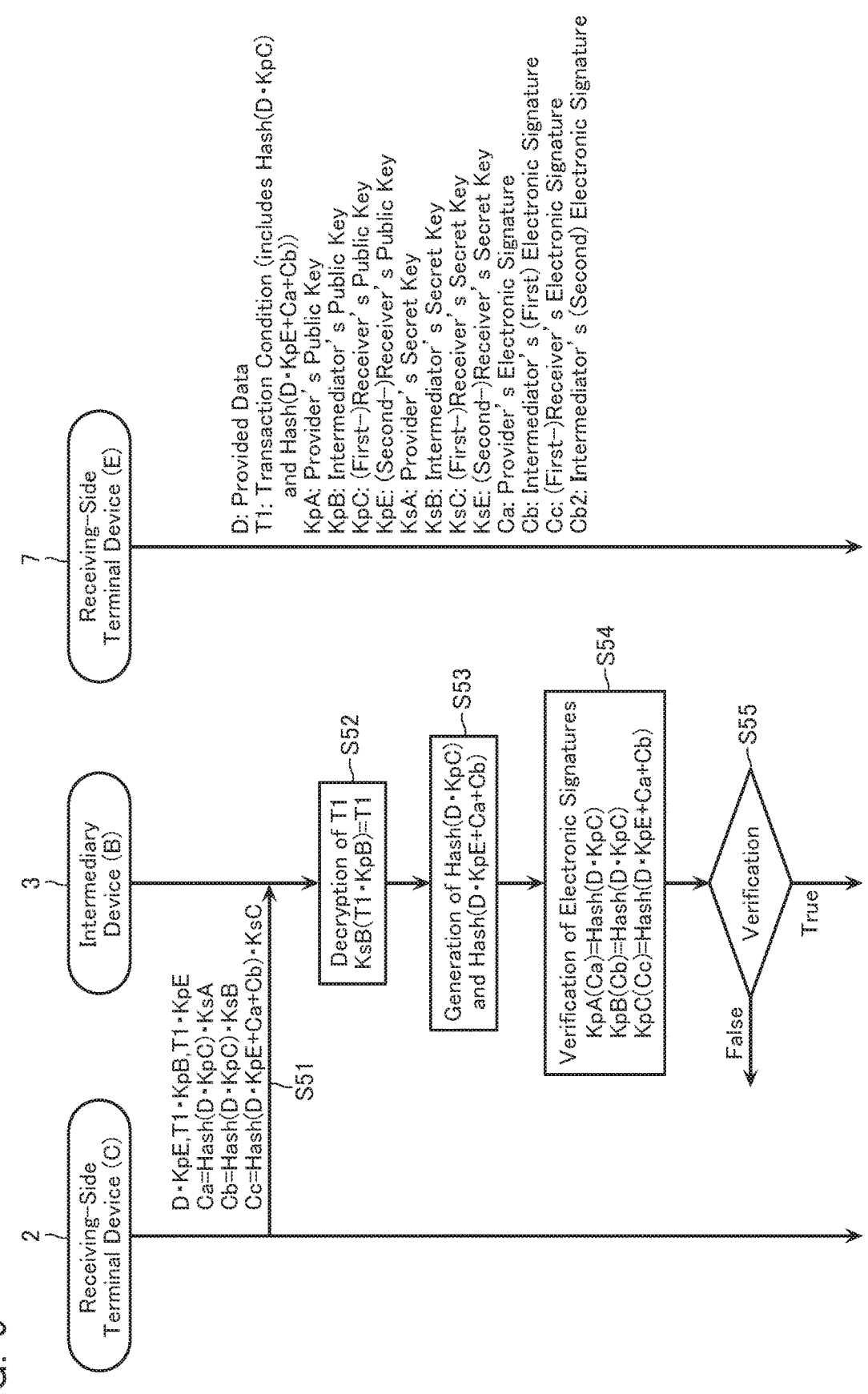

D: Provided Data
T1: Transaction Condition (includes Hash(D·KpC)) and Hash(D·KpE+Ca+Cb))
KpA: Provider's Public Key
KpB: Intermediator's Public Key
KpC: (First→)Receiver's Public Key
KpE: (Second→)Receiver's Public Key
KsA: Provider's Secret Key
KsB: Intermediator's Secret Key
KsC: (First→)Receiver's Secret Key
KsE: (Second→)Receiver's Secret Key
Ca: Provider's Electronic Signature
Cb: Intermediator's (First) Electronic Signature
Cc: (First→)Receiver's Electronic Signature
Cb2: Intermediator's (Second) Electronic Signature Receiving-Side Terminal Device (E) — 7

Intermediary Device (B) — 3

Receiving-Side Terminal Device (C) — 2

D·KpE,T1·KpB,T1·KpE
Ca=Hash(D·KpC)·KsA
Cb=Hash(D·KpC)·KsB
Cc=Hash(D·KpE+Ca+Cb)·KsC

S51

Decryption of T1
KsB(T1·KpB)=T1 — S52

Generation of Hash(D·KpC) and Hash(D·KpE+Ca+Cb) — S53

Verification of Electronic Signatures
KpA(Ca)=Hash(D·KpC)
KpB(Cb)=Hash(D·KpC)
KpC(Cc)=Hash(D·KpE+Ca+Cb) — S54

Verification — S55

False

True

FIG. 15

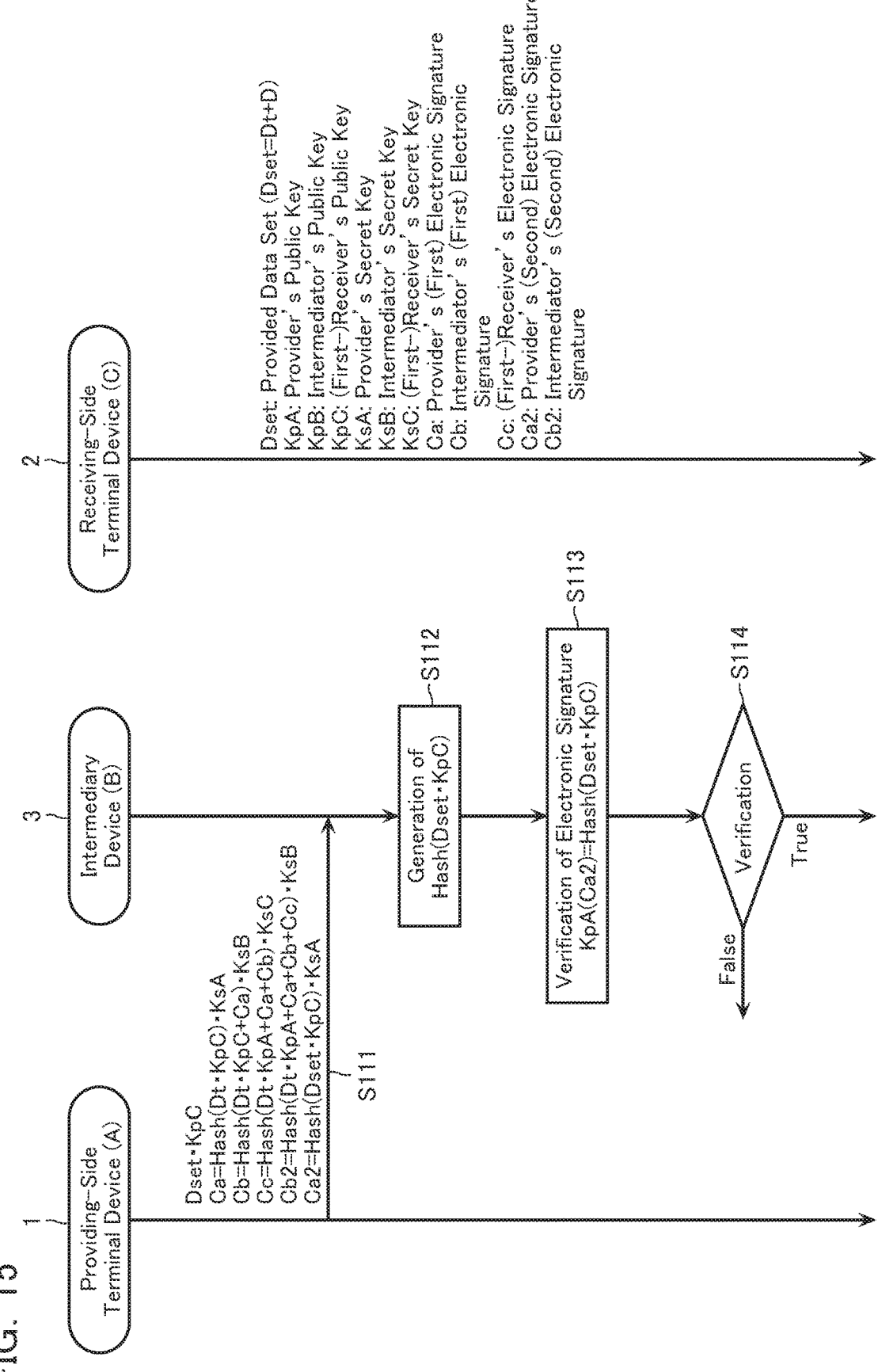

Dset: Provided Data Set (Dset=Dt+D)
KpA: Provider's Public Key
KpB: Intermediator's Public Key
KpC: (First-)Receiver's Public Key
KsA: Provider's Secret Key
KsB: Intermediator's Secret Key
KsC: (First-)Receiver's Secret Key
Ca: Provider's (First) Electronic Signature
Cb: Intermediator's (First) Electronic Signature
Cc: (First-)Receiver's Electronic Signature
Ca2: Provider's (Second) Electronic Signature
Cb2: Intermediator's (Second) Electronic Signature Receiving-Side Terminal Device (C)  2

Intermediary Device (B)  3

Generation of Hash(Dset·KpC)  S112

Verification of Electronic Signature KpA(Ca2)=Hash(Dset·KpC)  S113

Verification  S114
False
True

Providing-Side Terminal Device (A)  1

Dset·KpC
Ca=Hash(Dt·KpC)·KsA
Cb=Hash(Dt·KpC+Ca)·KsB
Cc=Hash(Dt·KpA+Ca+Cb)·KsC
Cb2=Hash(Dt·KpA+Ca+Cb+Cc)·KsB
Ca2=Hash(Dset·KpC)·KsA
S111

INFORMATION INTERMEDIARY SYSTEM AND INFORMATION INTERMEDIARY METHOD

TECHNICAL FIELD

The present invention relates to an information intermediary system and an information intermediary method that intermediate transfer of data.

BACKGROUND ART

There is known a data transfer system that intermediates transfer of data (refer to Patent Document 1, for example). This data transfer system manages transfer based on a validity period of the data, by means of a data intermediary device, and is configured capable of encrypting/decrypting data transferred between a data transmitting device and a data receiving device.

PRIOR ART DOCUMENT

Patent Document

Patent Document 1: Japanese Laid-Open Patent Publication No. 2015-82126

SUMMARY OF THE INVENTION

Problem to be Solved by the Invention

Generally, when intermediating an interchange including a transfer of data between a data transmitting device and a data receiving device by means of a data intermediary device like in the above-described Patent Document 1, the data transmitting device and the data receiving device do not perform exchange of the data directly. Therefore, authenticity of the data transferred by the data intermediary device, integrity of there being no qualitative change in the data as a result of it having passed through the data intermediary device, and so on, cannot be completely assured simply by encrypting/decrypting the data, and will be important elements not only among parties concerned with interchange of the data, but also for a manager who intermediates information.

Furthermore, securing of authenticity and integrity of transmission information such as provided data, a data use authorization certificate, and so on, will also be an important element for creating a safe data transaction market too.

The present invention has an object of providing an information intermediary system and an information intermediary method that enable authenticity and integrity of intermediated information to be guaranteed and its safety to be secured.

Means for Solving the Problem

An information intermediary system according to the present invention is an information intermediary system comprising: a providing-side terminal device which transmits transmission information that includes provided data; a receiving-side terminal device that receives the transmission information; and an intermediary device that intermediates transfer of the transmission information between the providing-side terminal device and the receiving-side terminal device, wherein the providing-side terminal device is assigned with a first public key and a first secret key, the intermediary device is assigned with a second public key and a second secret key, and the receiving-side terminal device is assigned with a third public key and a third secret key. The providing-side terminal device generates first encrypted data by encrypting the provided data with the third public key, and also generates a first electronic signature using the first secret key, and transmits the first encrypted data and the first electronic signature to the intermediary device. The intermediary device generates a second electronic signature using the second secret key, and transmits the first encrypted data, the first electronic signature, and the second electronic signature to the receiving-side terminal device. The receiving-side terminal device decrypts the first encrypted data with the third secret key to obtain the provided data, and also verifies the first electronic signature with the first public key and verifies the second electronic signature with the second public key.

An information intermediary method according to the present invention is an information intermediary method in an information intermediary system, the information intermediary system comprising: a providing-side terminal device which transmits transmission information that includes provided data; a receiving-side terminal device that receives the transmission information; and an intermediary device that intermediates transfer of the transmission information between the providing-side terminal device and the receiving-side terminal device, the information intermediary method including: assigning a first public key and a first secret key to the providing-side terminal device; assigning a second public key and a second secret key to the intermediary device; assigning a third public key and a third secret key to the receiving-side terminal device; using the providing-side terminal device to generate first encrypted data by encrypting the provided data with the third public key, and also to generate a first electronic signature using the first secret key, and to transmit the first encrypted data and the first electronic signature to the intermediary device; using the intermediary device to generate a second electronic signature using the second secret key, and to transmit the first encrypted data, the first electronic signature, and the second electronic signature to the receiving-side terminal device; and using the receiving-side terminal device to decrypt the first encrypted data with the third secret key and thereby obtain the provided data, and also to verify the first electronic signature with the first public key and to verify the second electronic signature with the second public key.

Another information intermediary system according to the present invention is an information intermediary system formed within a data distribution market-forming system and comprising: a first terminal device that transmits transmission information; a second terminal device that receives the transmission information; and an intermediary device that intermediates transfer of the transmission information between the first terminal device and the second terminal device, wherein the first terminal device is assigned with a first public key and a first secret key, the intermediary device is assigned with a second public key and a second secret key, and the second terminal device is assigned with a third public key and a third secret key, and the first terminal device generates first encrypted data by encrypting the transmission information with the third public key, and also generates a first electronic signature using the first secret key, and transmits the first encrypted data and the first electronic signature to the intermediary device, the intermediary device generates a second electronic signature using the second secret key, and transmits the first encrypted data, the first electronic signature, and the second electronic signature to the second terminal device, and the second terminal device decrypts the first encrypted data with the third secret key to obtain the transmission information, and also verifies the first electronic signature with the first public key and verifies the second electronic signature with the second public key.

Effect of the Invention

The present invention enables authenticity and integrity of intermediated information to be guaranteed and its safety to be secured.

BRIEF DESCRIPTION OF THE DRAWINGS

FIG. 9 is a sequence diagram showing an outline of same information intermediary system.

FIG. 15 is a sequence diagram showing an outline of an information intermediary system according to a sixth embodiment of the present invention.

EMBODIMENTS FOR CARRYING OUT THE INVENTION

Figure 1:
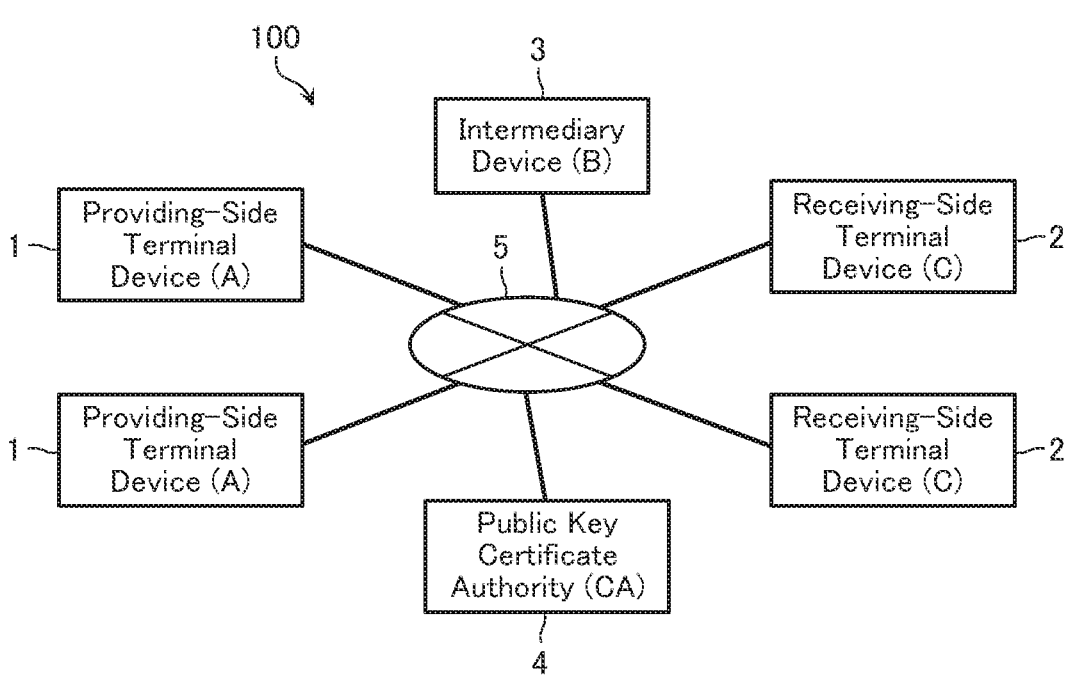
FIG. 1 is a block diagram showing configurations of an information intermediary system according to a first embodiment of the present invention.

Information intermediary systems and information intermediary methods according to embodiments of the present invention will be described in detail below with reference to the accompanying drawings. However, the embodiments below do not limit the inventions according to each of the claims, moreover, not all of the combinations of features described in the embodiments are necessarily essential to the means for solving the problem of the invention. Moreover, in the drawings, reduction scales or dimensions of each of the configuring elements will sometimes be shown exaggerated, and some of the configuring elements will sometimes be omitted.

First Embodiment

[Configurations of Information Intermediary System]

FIG. 1 is a block diagram showing configurations of an information intermediary system according to a first embodiment of the present invention.

As shown in FIG. 1, an information intermediary system 100 according to the present embodiment comprises: a providing-side terminal device (A) 1 which transmits transmission information that includes provided data; a receiving-side terminal device (C) 2 that receives this transmission information; and an intermediary device (B) 3 that intermediates transfer of the transmission information between the providing-side terminal device (A) 1 and the receiving-side terminal device (C) 2. In the information intermediary system 100, these providing-side terminal device (A) 1, receiving-side terminal device (C) 2, and intermediary device (B) 3 are connected via a network 5 such as an internet, enabling them to mutually communicate. This network 5 is further connected with a public key certificate authority (CA) 4 which is an external third-party organization.

Note that although in FIG. 1, two each are exemplified as each of the providing-side terminal device (A) 1 and the receiving-side terminal device (C) 2, the present invention is not limited to this. Moreover, a connection mode of each of configuring elements such as the providing-side terminal device (A) 1 is not limited to the network 5, and may be a cloud or the like. Moreover, the providing-side terminal device (A) 1, receiving-side terminal device (C) 2, and intermediary device (B) 3 may adopt a configuration of a publicly-known information processing device, arithmetic processing device, terminal device, and so on, such as a personal computer, a smartphone, a tablet terminal, a work station, a server device, and so on.

The information intermediary system 100 of the present embodiment presupposes that the providing-side terminal device (A) 1, intermediary device (B) 3, and receiving-side terminal device (C) 2 are assigned with public keys (Kp) and secret keys (Ks) based on an encryption system such as RSA that encrypts/decrypts the transmission information.

Specifically, the providing-side terminal device (A) 1 is assigned with a provider's public key (KpA) being a first public key, and a provider's secret key (KsA) being a first secret key. In the case of the provider's public key (KpA) being registered in the public key certificate authority (CA) 4, the providing-side terminal device (A) 1 will have a provider's public key certificate (CKpA) being a first public key certificate, issued from the public key certificate authority (CA) 4.

Moreover, the intermediary device (B) 3 is assigned with an intermediator's public key (KpB) being a second public key, and an intermediator's secret key (KsB) being a second secret key. In the case of the intermediator's public key (KpB) being registered in the public key certificate authority (CA) 4, the intermediary device (B) 3 will have an intermediator's public key certificate (CKpB) being a second public key certificate, issued from the public key certificate authority (CA) 4.

Furthermore, the receiving-side terminal device (C) 2 is assigned with a receiver's public key (KpC) being a third public key, and a receiver's secret key (KsC) being a third secret key. In the case of the receiver's public key (KpC) being registered in the public key certificate authority (CA) 4, the receiving-side terminal device (C) 2 will have a receiver's public key certificate (CKpC) being a third public key certificate, issued from the public key certificate authority (CA) 4. Since the first to third public key certificates (CKpA, CKpB, CKpC) are authenticated by the public key certificate authority (CA) 4, they can be utilized in prevention of impersonation by sending them to other parties of the information transfer.

[Flow of Information Intermediation of Information Intermediary System 100]

Figure 2:
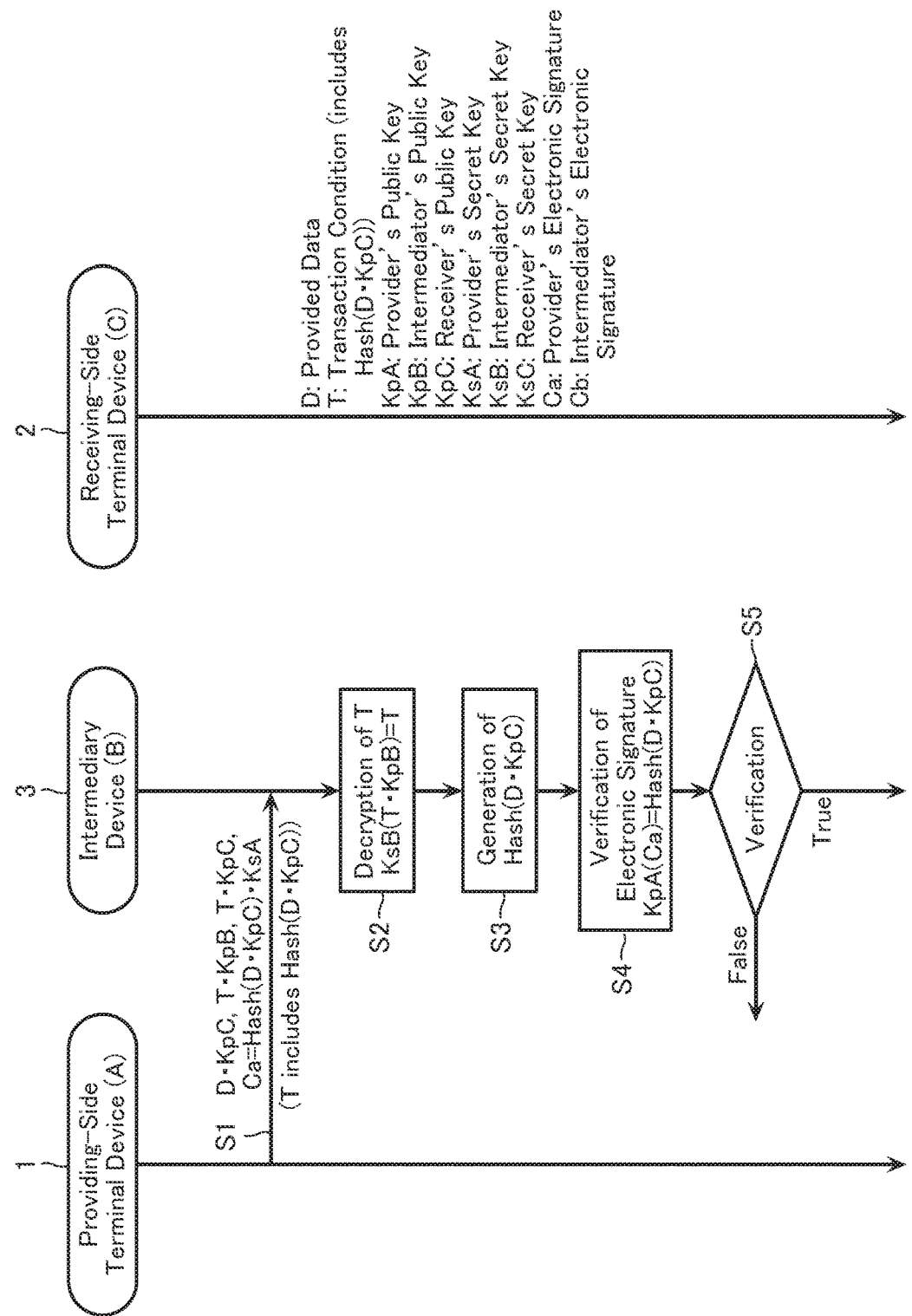
FIG. 2 is a sequence diagram showing an outline of same information intermediary system.
Figure 3:
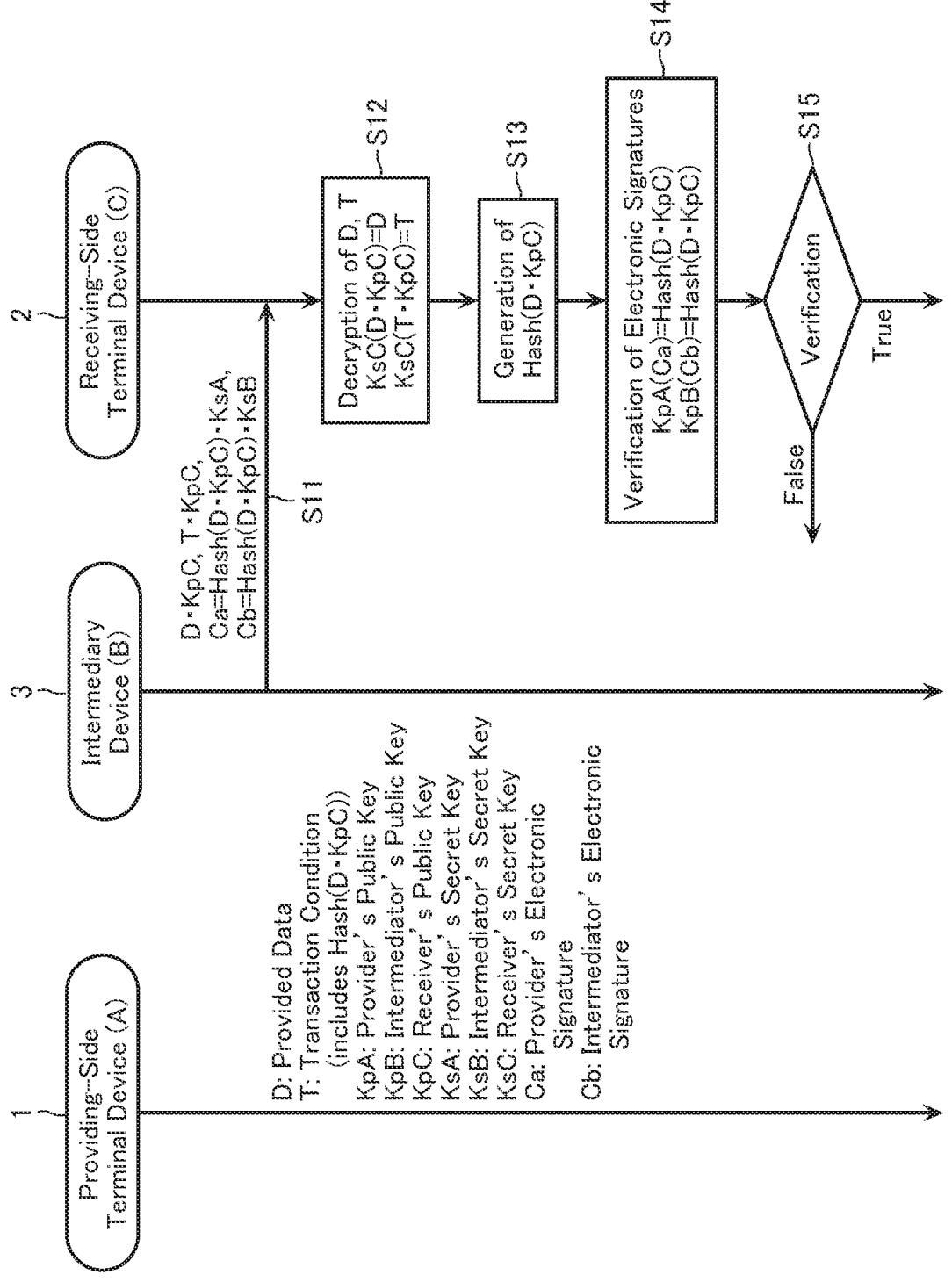
FIG. 3 is a sequence diagram showing an outline of same information intermediary system.

FIGS. 2 and 3 are sequence diagrams showing an outline of sending/receiving of information in the information intermediary system 100. Regarding handling of information herein, the respective public keys (KpA, KpB, KpC) and public key certificates (CKpA, CKpB, CKpC) are assumed to be priorly mutually exchanged between the providing-side terminal device (A) 1, intermediary device (B) 3, and receiving-side terminal device (C) 2.

The transmission information that the providing-side terminal device (A) 1 being a first terminal device provides to the receiving-side terminal device (C) 2 being a second terminal device includes, for example: provided data (D) being first data, such as a data file, that is to be an object of transaction; and a transaction condition (T) being second data, that includes information such as range-of-use and price-of-provision of this provided data (D). Of these, the provided data (D) cannot be seen by the intermediary device (B) 3. On the other hand, the transaction condition (T) needs to be confirmed by the intermediary device (B) 3 too.

As shown in FIG. 2, first, the providing-side terminal device (A) 1 generates first encrypted data (D·KpC) by encrypting the provided data (D) with the receiver's public key (KpC) (step S1). In addition, the providing-side terminal device (A) 1 generates second encrypted data (T·KpB) by encrypting the transaction condition (T) with the intermediator's public key (KpB) (step S1). Furthermore, the providing-side terminal device (A) 1 generates third encrypted data (T·KpC) by encrypting the transaction condition (T) with the receiver's public key (KpC) (step S1). Note that in order that the transaction condition (T) be correlated with the provided data (D), there is included in the transaction condition (T) a hash value (Hash(D·KpC)) which is obtained by rendering the first encrypted data (D·KpC) as a one-way function such as a hash function (Hash), for example. Hereafter, when a "hash value" is referred to, it will be assumed to indicate a "hash value" that has been rendered by a hash function.

Moreover, the providing-side terminal device (A) 1 generates a provider's electronic signature (Ca=Hash(D·KpC) ·KsA) being a first electronic signature, using the hash value (Hash(D·KpC)) obtained from the first encrypted data (D·KpC), and using the provider's secret key (KsA). The providing-side terminal device (A) 1 transmits the thus-generated each item of encrypted data (D·KpC, T·KpB, T·KpC) and provider's electronic signature (Ca) to the intermediary device (B) 3 (step S1).

The intermediary device (B) 3 obtains the transaction condition (T) by decrypting the received second encrypted data (T·KpB) with the intermediator's secret key (KsB) (step S2). In addition, the intermediary device (B) 3 generates the hash value (Hash(D·KpC)) from the received first encrypted data (D·KpC) (step S3). Furthermore, the intermediary device (B) 3 decrypts the hash value (Hash(D·KpC)) from the provider's electronic signature (Ca) using the provider's public key (KpA) (step S4). Then, the intermediary device (B) 3 confirms whether or not the hash value (Hash(D·KpC)) included in the transaction condition (T), the hash value (Hash(D·KpC)) generated from the first encrypted data (D·KpC), and the hash value (Hash(D·KpC)) decrypted from the provider's electronic signature (Ca) all match. The intermediary device (B) 3 can verify by these all matching, that the transaction condition (T) that has been sent is information that relates to the provided data (D) and has been directed to the intermediary device (B) 3, and that its originator is the providing-side terminal device (A) 1 (step S5).

Next, as shown in FIG. 3, the intermediary device (B) 3 generates an intermediator's electronic signature (Cb=Hash(D·KpC)·KsB) being a second electronic signature, using the hash value (Hash(D·KpC)) obtained from the received first encrypted data (D·KpC), and using the intermediator's secret key (KsB) (step S11). Then, the intermediary device (B) 3 transmits the received items of encrypted data (D·KpC, T·KpC) and provider's electronic signature (Ca), and the generated intermediator's electronic signature (Cb) to the receiving-side terminal device (C) 2 (step S11).

The receiving-side terminal device (C) 2 decrypts the received items of encrypted data (D·KpC, T·KpC) using the receiver's secret key (KsC), and obtains the provided data (D) and the transaction condition (T) (step S12). In addition, the receiving-side terminal device (C) 2 generates the hash value (Hash(D·KpC)) as a computed result, from the obtained provided data (D) (step S13). Moreover, the receiving-side terminal device (C) 2 verifies (KpA (Ca)=Hash(D·KpC)) the provider's electronic signature (Ca) with the provider's public key (KpA) to obtain the hash value (Hash(D·KpC)) as a decrypted result (step S14). In addition, the receiving-side terminal device (C) 2 verifies (KpB(Cb) =Hash(D·KpC)) the intermediator's electronic signature (Cb) with the intermediator's public key (KpB) to obtain the hash value (Hash(D·KpC)) as a decrypted result (step S14).

Then, the receiving-side terminal device (C) 2 confirms whether or not the hash value (Hash(D·KpC)) included in the transaction condition (T), the hash value (Hash(D·KpC)) generated from the provided data (D), the hash value (Hash(D·KpC)) decrypted from the provider's electronic signature (Ca), and the hash value (Hash(D·KpC)) decrypted from the intermediator's electronic signature (Cb) all match. The receiving-side terminal device (C) 2 can verify by these all matching, that the transaction condition (T) that has been sent is information that relates to the provided data (D) and has been directed to the receiving-side terminal device (C) 2, and that its originator is the providing-side terminal device (A) 1 and its intermediator is the intermediary device (B) 3 (step S15).

Thus, due to the present embodiment, in the case where, as a result of verification, all of the obtained hash values (Hash(D·KpC)) are determined to be the same (True in step S15), it can be determined that the provided data (D) and transaction condition (T) are authentic, have been provided from the providing-side terminal device (A) 1, and have been transmitted toward the receiving-side terminal device (C) 2, via the intermediary device (B) 3.

On the other hand, in the case where, as a result of verification, any one of the obtained hash values (Hash(D·KpC)) is determined to differ (False in step S15), it can be determined that the provided data (D) or transaction condition (T) is inauthentic, has not been provided from the provider, or has not been intermediated by the intermediator.

In this case, the possibility of falsification or impersonation having occurred in the provided data (D) or transaction condition (T) is high, so the receiver may adopt a countermeasure such as notifying the provider. Note that by pinpointing a transmitter, communication route, and so on, of the information of that one of the above-described various results that indicates a differing result, it is possible to attempt an investigation of the falsification, and so on.

Note that a configuration may be adopted so that data communication from the intermediary device (B) 3 to the receiving-side terminal device (C) 2 in above-described step S11 will be performed when payment information such as price to be paid to the providing-side terminal device (A) 1 in relation to the provided data (D) has been received from the receiving-side terminal device (C) 2, by the intermediary device (B) 3. By doing so, it can be prevented that the encrypted data (D·KpC), provider's electronic signature (Ca), and intermediator's electronic signature (Cb) end up being casually transmitted to the receiving-side terminal device (C) 2 in a state where confirmation of payment by the receiver to the provider, and so on, has not been obtained.

Moreover, in above-described step S11, the intermediator's electronic signature (Cb) transmitted from the intermediary device (B) 3 to the receiving-side terminal device (C) 2 may include the provider's electronic signature (Ca) in order to confirm that the intermediator's electronic signature (Cb) has been certainly received from the providing-side terminal device (A) 1. For example, the intermediator's electronic signature (Cb) may be generated (Cb=Hash (D·KpC+Ca)·KsB) using a hash value (Hash(D·KpC+Ca)) that includes the provider's electronic signature (Ca), and using the intermediator's secret key (KsB).

Second Embodiment

[Configurations of Information Intermediary System]

Figure 4:
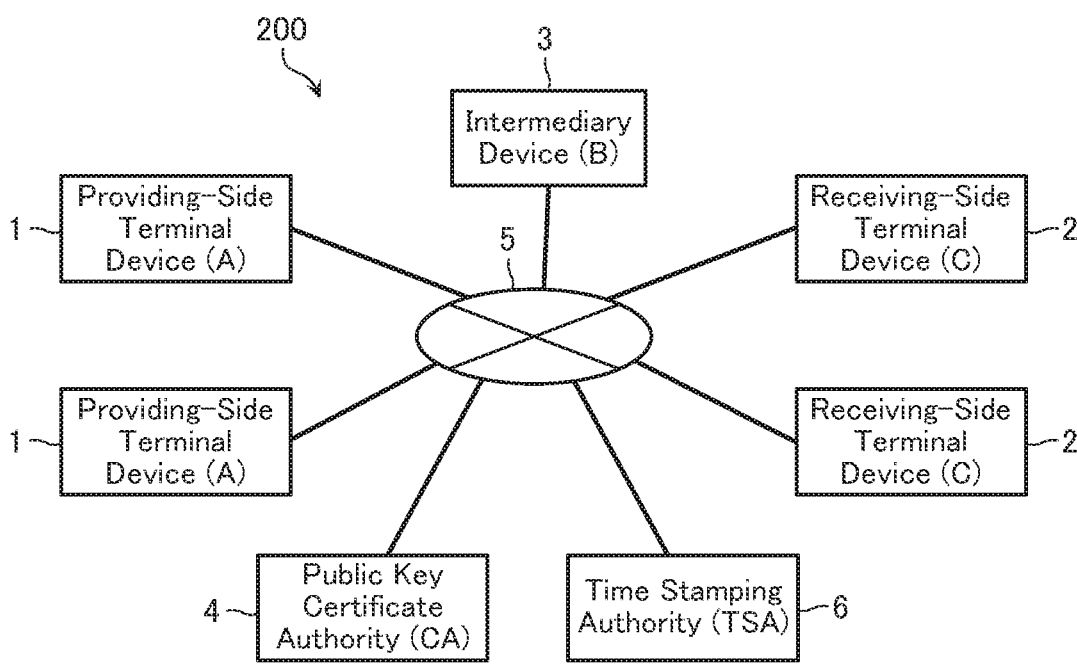
FIG. 4 is a block diagram showing configurations of an information intermediary system according to a second embodiment of the present invention.

FIG. 4 is a block diagram showing configurations of an information intermediary system according to a second embodiment of the present invention. Note that in FIG. 4, a configuration similar to in FIG. 1 will be assigned with the same symbol as in FIG. 1, and a duplicated description of the configuration will be omitted.

As shown in FIG. 4, an information intermediary system 200 according to the present embodiment has a time stamping authority (TSA) 6 added to the information intermediary system 100 shown in FIG. 1. The time stamping authority (TSA) 6 is connected to the providing-side terminal device (A) 1, the receiving-side terminal device (C) 2, the intermediary device (B) 3, and the public key certificate authority (CA) 4, via the network 5. When the time stamping authority (TSA) 6 receives data (X) to be an object of time authentication, in a form of a hash value (Hash(X)), the time stamping authority (TSA) 6 returns a time-stamp (token) Ts having that hash value (Hash(X)) added to time information. Other configurations are similar to in FIG. 1.

[Flow of Information Intermediation of Information Intermediary System 200]

Figure 5:
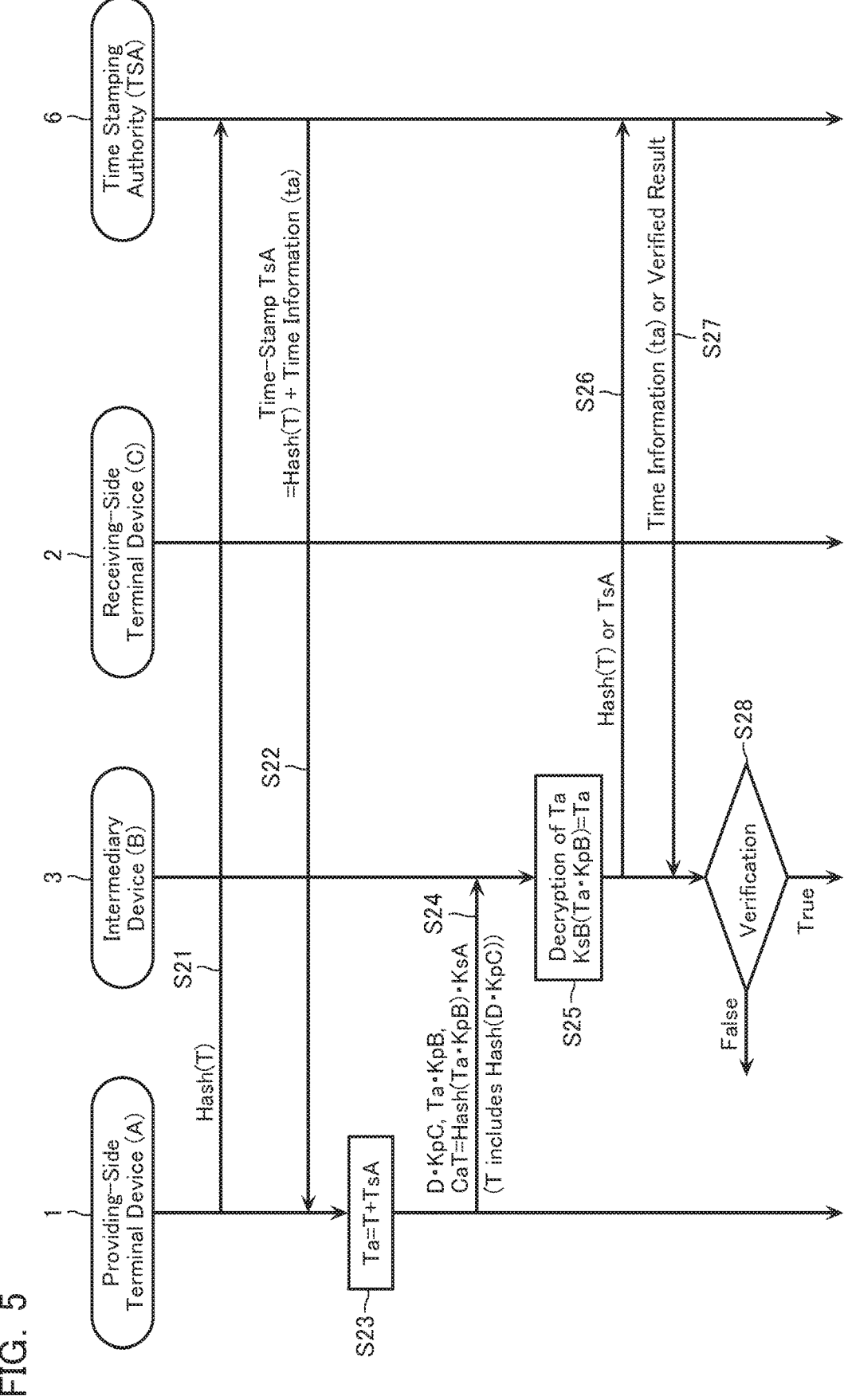
FIG. 5 is a sequence diagram showing an outline of same information intermediary system.
Figure 6:
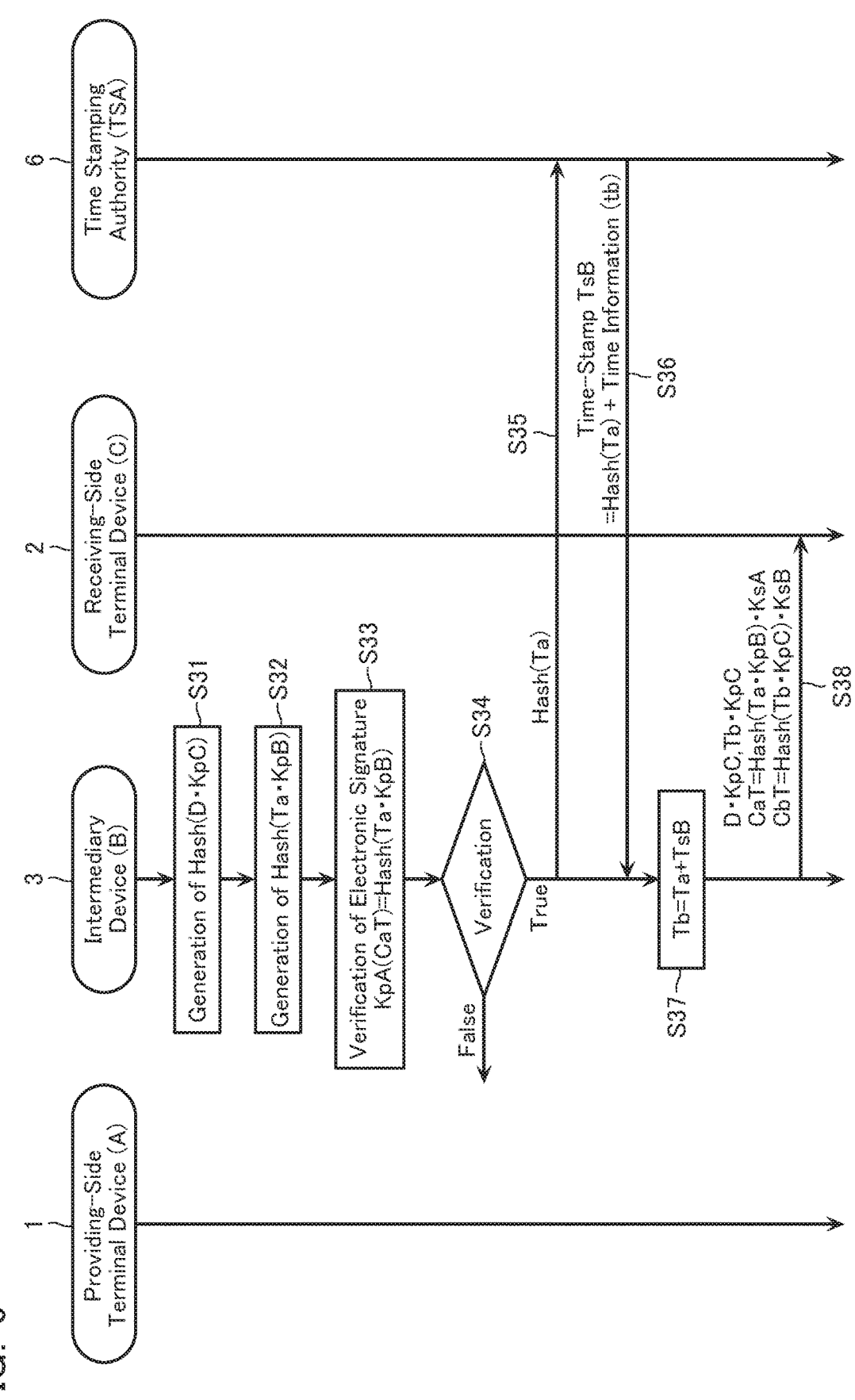
FIG. 6 is a sequence diagram showing an outline of same information intermediary system.
Figure 7:
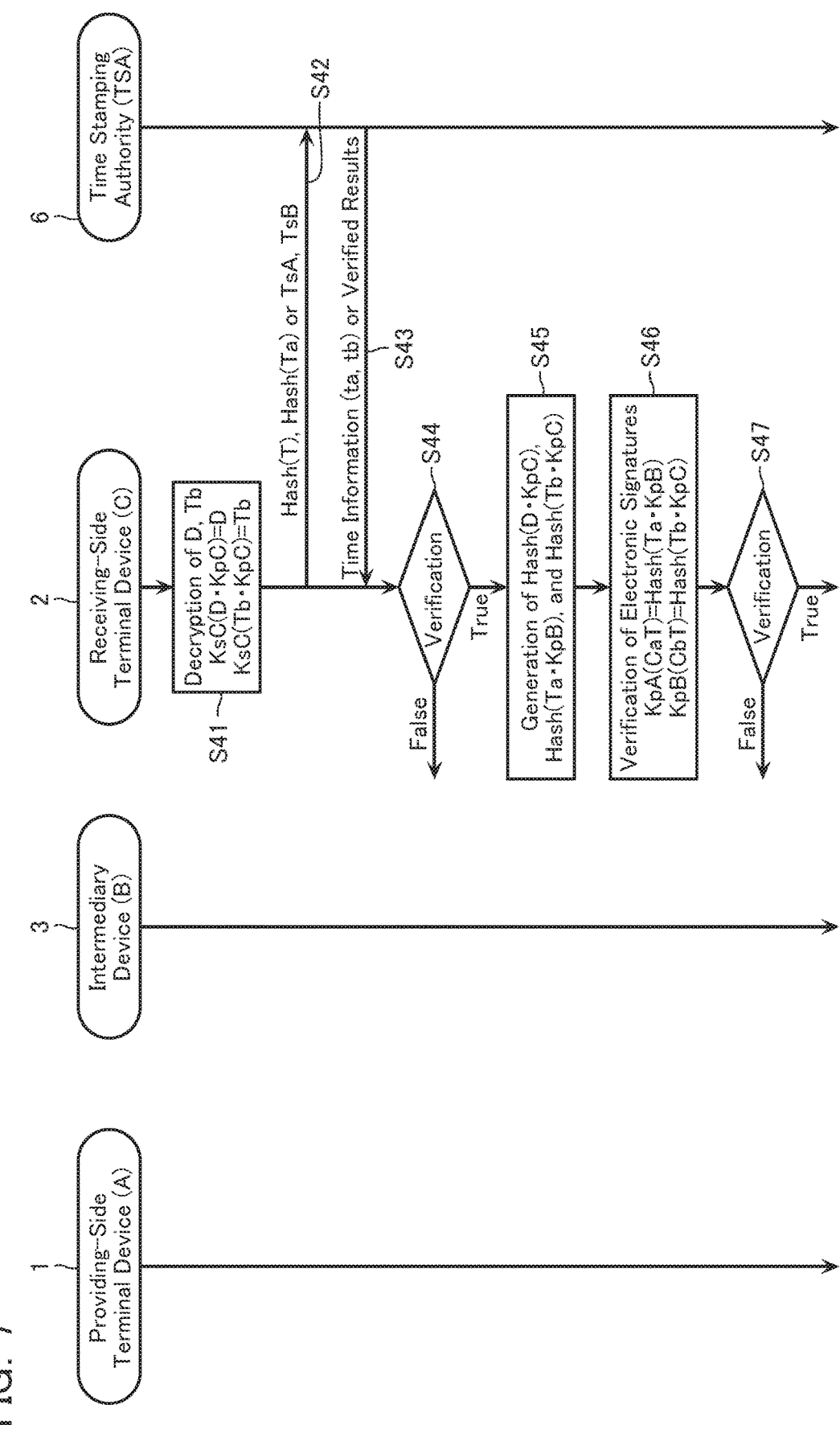
FIG. 7 is a sequence diagram showing an outline of same information intermediary system.

FIGS. 5 to 7 are sequence diagrams showing an outline of sending/receiving of information in the information intermediary system 200. Regarding handling of information herein, too, the respective public keys (KpA, KpB, KpC) and public key certificates (CKpA, CKpB, CKpC) are priorly mutually exchanged between the providing-side terminal device (A) 1, intermediary device (B) 3, and receiving-side terminal device (C) 2, similarly to in the previous embodiment.

As shown in FIG. 5, first, the providing-side terminal device (A) 1 sends to the time stamping authority (TSA) 6 a hash value (Hash(T)) obtained by rendering the transaction condition (T) as a one-way function (step S21). The time stamping authority (TSA) 6 transmits to the providing-side terminal device (A) 1 a time-stamp (TsA) being a first time-stamp, that has time information (ta) added to the hash value (Hash(T)) (step S22). When the providing-side terminal device (A) 1 receives the time-stamp (TsA), the providing-side terminal device (A) 1 generates first time-authenticated data (Ta) by adding the time-stamp (TsA) to the transaction condition (T) (step S23).

Next, the providing-side terminal device (A) 1 generates the first encrypted data (D·KpC) by encrypting the provided data (D) with the receiver's public key (KpC) (step S24). In addition, the providing-side terminal device (A) 1 generates second encrypted data (Ta·KpB) by encrypting the first time-authenticated data (Ta) with the intermediator's public key (KpB) (step S24). Note that in order that the transaction condition (T) included in the first time-authenticated data (Ta) be correlated with the provided data (D), there is included in the transaction condition (T) the hash value (Hash(D·KpC)) which is obtained by rendering the first encrypted data (D·KpC) as a one-way function such as a hash function (Hash), for example.

Moreover, the providing-side terminal device (A) 1 generates a provider's electronic signature (CaT=Hash(Ta·KpB) ·KsA) using a hash value (Hash(Ta·KpB)) obtained from the second encrypted data (Ta·KpB), and using the provider's secret key (KsA) (step S24). The providing-side terminal device (A) 1 transmits the thus-generated items of encrypted data (D·KPC, Ta·KpB) and provider's electronic signature (Car) to the intermediary device (B) 3 (step S24).

The intermediary device (B) 3 obtains the first time-authenticated data (Ta) by decrypting the received second encrypted data (Ta·KpB) with the intermediator's secret key (KsB) (step S25). The intermediary device (B) 3 extracts from the decrypted first time-authenticated data (Ta) the hash value (Hash(T)) or time-stamp TsA, and transmits the extracted hash value (Hash(T)) or time-stamp TsA to the time stamping authority (TSA) 6 for verification (step S26). The time stamping authority (TSA) 6 returns to the intermediary device (B) 3 authentication-completed time information (ta) or a verified result, correspondingly to the received hash value (Hash(T)) or time-stamp TsA (step S27). The intermediary device (B) 3 receives the time information (ta) or verified result that has been transmitted from the time stamping authority (TSA) 6, and verifies that the time information (ta) is authentic (step S28).

Next, as shown in FIG. 6, the intermediary device (B) 3 generates the hash value (Hash(D·KpC)) from the received first encrypted data (D·KpC) (step S31). In addition, the intermediary device (B) 3 generates the hash value (Hash (Ta·KpB)) from the decrypted first time-authenticated data (Ta) using the intermediator's public key (KpB) (step S32). Furthermore, the intermediary device (B) 3 verifies (KpA (CaT)=Hash(Ta·KpB)) the provider's electronic signature (CaT) with the provider's public key (KpA), and obtains the hash value (Hash(Ta·KpB)) (step S33). Then, by confirming that the transaction condition (T) included in the decrypted first time-authenticated data (Ta) includes the hash value (Hash(D·KpC)), the intermediary device (B) 3 can verify that the transaction condition (T) that has been sent relates to the provided data (D) (step S34). Moreover, depending on whether or not the hash values (Hash(Ta·KpB)) found from the decrypted first time-authenticated data (Ta) and from the received first electronic signature (Ca) are the same, it can be verified by the intermediary device (B) 3 that the information that has been sent is information that has been directed to the intermediary device (B) 3, and that its originator is the providing-side terminal device (A) 1 (step S34).

Next, the intermediary device (B) 3 transmits the hash value (Hash(Ta)) of the decrypted first time-authenticated data (Ta) to the time stamping authority (TSA) 6 (step S35). The time stamping authority (TSA) 6 transmits to the intermediary device (B) 3 a time-stamp (TsB) being a second time-stamp, that has time information (tb) added to the hash value (Hash(Ta)) (step S36). When the intermediary device (B) 3 receives the time-stamp (TsB), the intermediary device (B) 3 generates second time-authenticated data (Tb) by adding the time-stamp (TsB) to the first time-authenticated data (Ta) (step S37). As a result, the second time-authenticated data (Tb) will include the transaction condition (T) and the two time-stamps (TsA, TsB).

The intermediary device (B) 3 transmits to the receiving-side terminal device (C) 2 the first encrypted data (D·KpC) that the intermediary device (B) 3 has received, and third encrypted data (Tb·KpC) that the intermediary device (B) 3 has obtained by encrypting the second time-authenticated data (Tb) with the receiver's public key (KpC) (step S38). In addition, the intermediary device (B) 3 transmits to the receiving-side terminal device (C) 2 the provider's first electronic signature (Ca) that the intermediary device (B) 3 has received, and an intermediator's second electronic signature (CbT=Hash(Tb·KpC)·KsB) generated by the intermediary device (B) 3 from a hash value Hash(Tb·KpC) of the third encrypted data (Tb·KpC) using the intermediator's secret key (KsB) (step S38).

As shown in FIG. 7, the receiving-side terminal device (C) 2 decrypts the received items of encrypted data (D·KpC, Tb·KpC) using the receiver's secret key (KsC), and obtains the provided data (D) and the second time-authenticated data (Tb) (step S41). The receiving-side terminal device (C) 2 extracts from the decrypted second time-authenticated data (Tb) the hash values (Hash(T), Hash(Ta)) or time-stamps TsA, TsB, and transmits the extracted hash values (Hash(T), Hash(Ta)) or time-stamps TsA, TsB to the time stamping authority (TSA) 6 for verification (step S42). The time stamping authority (TSA) 6 returns to the receiving-side terminal device (C) 2 authentication-completed items of time information (ta, tb) or verified results, correspondingly to the received hash values (Hash(T), Hash(Ta)) or time-stamps TsA, TsB (step S43). The receiving-side terminal device (C) 2 receives the items of time information (ta, tb) or verified results that have been transmitted from the time stamping authority (TSA) 6, and verifies whether or not the items of time information (ta, tb) are authentic (step S44).

Next, the receiving-side terminal device (C) 2 generates the hash values (Hash(D·KpC), Hash(Ta·KpB), Hash(Tb·KpC)) from the obtained provided data (D) and second time-authenticated data (Tb) (step S45). In addition, the receiving-side terminal device (C) 2 respectively verifies the first and second electronic signatures (CaT, CbT) with the provider's and intermediator's public keys (KpA, KpB) to obtain the hash values (Hash(Ta·KpB), Hash(Tb·KpC)) (step S46).

Then, the receiving-side terminal device (C) 2 confirms whether or not the hash value (Hash(D·KpC)) included in the transaction condition (T) within the second time-authenticated data (Tb), and the hash value (Hash(D·KpC)) generated from the provided data (D) match. The receiving-side terminal device (C) 2 can thereby confirm that the transaction condition (T) relates to the provided data (D) (step S47).

In addition, the receiving-side terminal device (C) 2 confirms whether or not the hash values (Hash(Ta·KpB), Hash(Tb·KpC)) generated from the decrypted provided data (D) and first and second time-authenticated data items (Ta, Tb), and the hash values (Hash(Ta·KpB), Hash(Tb·KpC)) obtained from the first and second electronic signatures (CaT, CbT) match. The receiving-side terminal device (C) 2 can verify by these matching, that the provided data (D) and transaction condition (T) that have been sent are items of information that have been directed to the receiving-side terminal device (C) 2, that their originator is the providing-side terminal device (A) 1 and intermediator is the intermediary device (B) 3, and that the items of time information (ta, tb) of when these have been created are authentic (step S47).

Thus, due to the present embodiment, it is possible, as a result of verification, to obtain respective verifications of the fact that the transmitted items of information have been provided from the providing-side terminal device (A) 1 to the receiving-side terminal device (C) 2 via the intermediary device (B) 3, and of the times when these items of information have been created.

Third Embodiment

[Configurations of Information Intermediary System]

Figure 8:
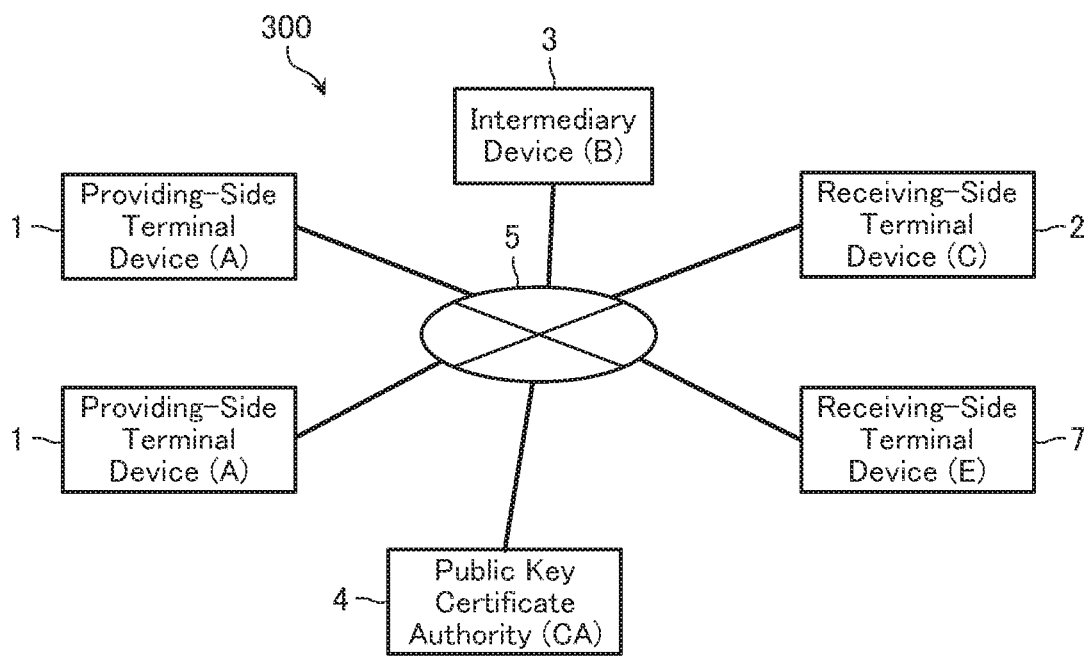
FIG. 8 is a block diagram showing configurations of an information intermediary system according to a third embodiment of the present invention.

FIG. 8 is a block diagram showing configurations of an information intermediary system according to a third embodiment of the present invention. Note that in description from here onwards, including FIG. 8, a configuring element which is the same as in the first and second embodiments will be assigned with the same symbol as in the first and second embodiments, so a duplicated description thereof will be omitted below.

As shown in FIG. 8, an information intermediary system 300 according to the third embodiment comprises: the providing-side terminal device (A) 1 which transmits the transmission information that includes the provided data; and a first receiving-side terminal device (C) 2 and second receiving-side terminal device (E) 7 that receive this transmission information. In addition, the information intermediary system 300 comprises the intermediary device (B) 3 that intermediates transfer of the transmission information between the providing-side terminal device (A) 1 and first and second receiving-side terminal devices (C) 2, (E) 7, or between the first receiving-side terminal device (C) 2 and second receiving-side terminal device (E) 7. These providing-side terminal device (A) 1, first and second receiving-side terminal devices (C) 2, (E) 7, and intermediary device (B) 3 are connected in a manner enabling them to mutually communicate via the network 5 which is connected with the public key certificate authority (CA) 4 being an external third-party organization.

The information intermediary system 300 of the third embodiment presupposes that the providing-side terminal device (A) 1, intermediary device (B) 3, and first and second receiving-side terminal devices (C) 2, (E) 7 are assigned with public keys (Kp) and secret keys (Ks) based on an encryption system such as RSA that encrypts/decrypts the transmission information.

Specifically, with regard to the providing-side terminal device (A) 1 and intermediary device (B) 3 being assigned with each of public keys (KpA, KpB) and secret keys (KsA, KsB), and having each of public key certificates (CKpA, CKpB), this is similar to in the first embodiment, hence a description thereof will be omitted herein.

The first receiving-side terminal device (C) 2 is assigned with a first-receiver's public key (KpC) and a first-receiver's secret key (KsC). Moreover, the second receiving-side terminal device (E) 7 is assigned with a second-receiver's public key (KpE) and a second-receiver's secret key (KsE). In the case of the first- and second-receivers' public keys (KpC, KpE) being registered in the public key certificate authority (CA) 4, the first and second receiving-side terminal devices (C) 2, (E) 7 will have first- and second-receivers' public key certificates (CKpC, CKpE) being public key certificates, issued from the public key certificate authority (CA) 4. Since the public key certificates (CKpA, CKpB, CKpC, CKpE) are each authenticated by the public key certificate authority (CA) 4, they can be utilized in prevention of impersonation by sending them to other parties of the information transfer.

[Flow of Information Intermediation of Information Intermediary System 300]

Figure 10:
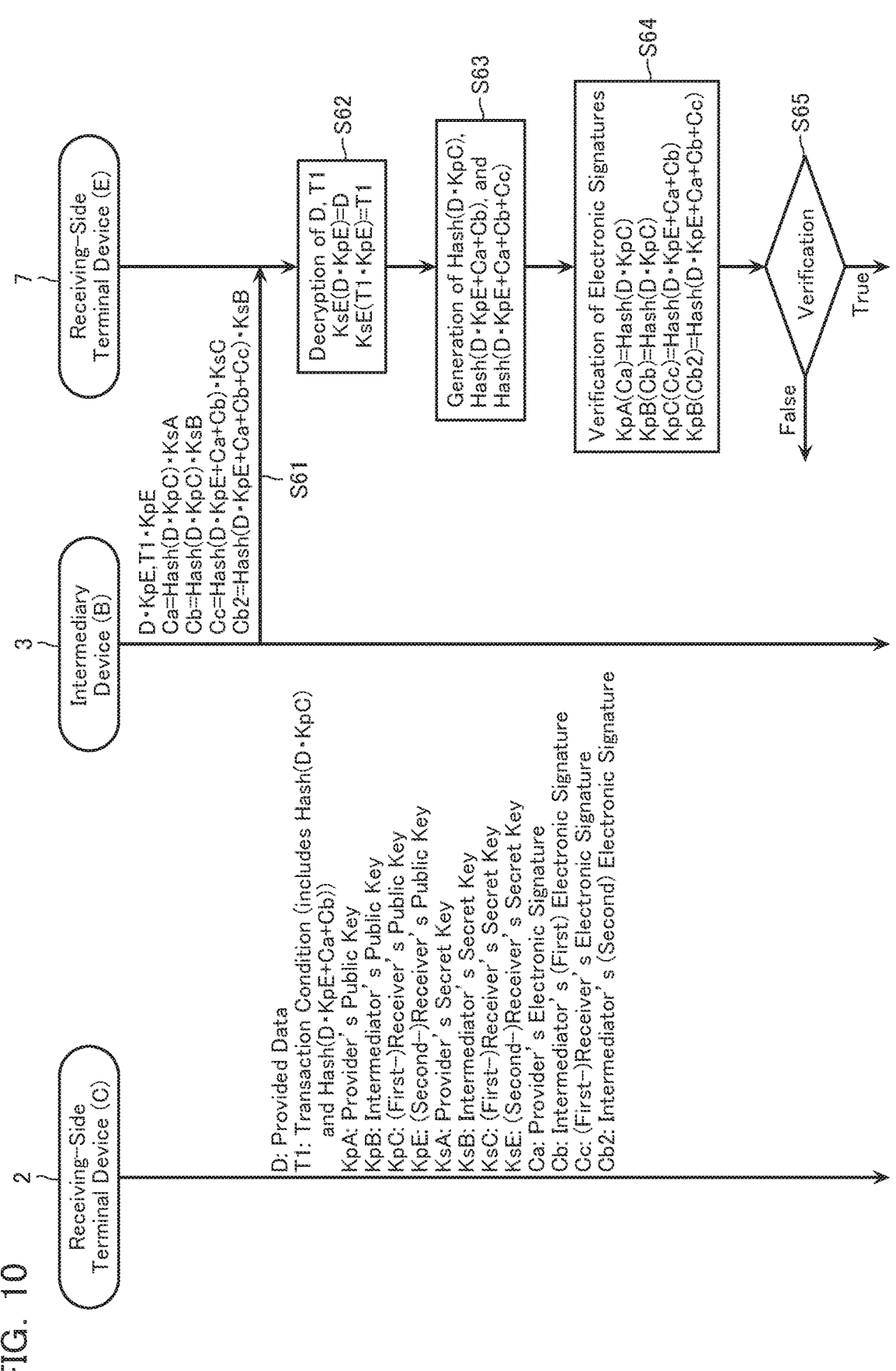
FIG. 10 is a sequence diagram showing an outline of same information intermediary system.

FIGS. 9 and 10 are sequence diagrams showing an outline of sending/receiving of information in the information intermediary system 300. Regarding handling of information herein, the respective public keys (KpA, KpB, KpC, KpE) and public key certificates (CKpA, CKpB, CKpC, CKpE) are assumed to be priorly mutually exchanged between the providing-side terminal device (A) 1, intermediary device (B) 3, first receiving-side terminal device (C) 2, and second receiving-side terminal device (E) 7.

Moreover, hereafter, there will be supposed the case where, for example, the first receiving-side terminal device (C) 2 that has already obtained the provided data (D) such as the data file to be the object of transaction, and already obtained the transaction condition (T), after True in above-mentioned step S15, will be the provider. That is, there will be described the case where the transmission information is provided from the first-receiver of the first receiving-side terminal device (C) 2 to the second-receiver of the second receiving-side terminal device (E) 7 being likewise on the receiving side, that is, the case where the provided data (D) is distributed from device to device (transferred, and retransferred). Hence, in this embodiment, the first receiving-side terminal device (C) 2 will be the first terminal device, and the second receiving-side terminal device (E) 7 will be the second terminal device. Moreover, the first-receiver's public key (KpC) and first-receiver's secret key (KsC) will respectively be the first public key and first secret key, and the second-receiver's public key (KpE) and second-receiver's secret key (KsE) will respectively be the third public key and third secret key.

The transmission information that the first receiving-side terminal device (C) 2 provides to the second receiving-side terminal device (E) 7 includes, for example: the above-described provided data (D); and a transaction condition (T1) that includes information such as range-of-use and price-of-provision of this provided data (D). Of these, the provided data (D) cannot be seen by the intermediary device (B) 3. However, the transaction condition (T1) needs to be confirmed by the intermediary device (B) 3 too.

As shown in FIG. 9, first, the first receiving-side terminal device (C) 2 generates first encrypted data (D·KpE) by encrypting the provided data (D) with the second-receiver's public key (KpE) (step S51). In addition, the first receiving-side terminal device (C) 2 generates second encrypted data (T1·KpB) by encrypting the transaction condition (T1) with the intermediator's public key (KpB) (step S51). Furthermore, the first receiving-side terminal device (C) 2 generates third encrypted data (T1·KpE) by encrypting the transaction condition (T1) with the second-receiver's public key (KpE) (step S51). Note that in order that the transaction condition (T1) be correlated with the provided data (D), there are included in the transaction condition (T1) the hash value (Hash(D·KpC)) and a hash value (Hash(D·KpE+Ca+Cb)) respectively found from the encrypted data (D·KpC) and from a value obtained by adding the electronic signatures (Ca, Cb) to the encrypted data (D·KpE).

Moreover, the first receiving-side terminal device (C) 2 generates the hash value (Hash(D·KpE+Ca+Cb)) of the value obtained when the provider's electronic signature (Ca) and the intermediator's electronic signature (intermediator's first electronic signature) (Cb) are included in the encrypted data (D·KpE), and, using this hash value (Hash(D·KpE+Ca+Cb)) and the secret key (KsC) of the first-receiver being the provider in this case, generates a first-receiver's electronic signature (Cc=Hash(D·KpE+Ca+Cb)·KsC) (step S51). The first receiving-side terminal device (C) 2 transmits the thus-generated each item of encrypted data (D·KpE, T1·KpB, T1·KpE), provider's electronic signature (Ca), intermediator's first electronic signature (Cb), and first-receiver's electronic signature (Cc), to the intermediary device (B) 3 (step S51).

The intermediary device (B) 3 obtains the transaction condition (T1) by decrypting the received second encrypted data (T1·KpB) with the intermediator's secret key (KsB) (step S52). In addition, the intermediary device (B) 3 generates the hash value (Hash(D·KpC)) and hash value (Hash(D·KpE+Ca+Cb)) from the decrypted transaction condition (T1) (step S53).

Moreover, the intermediary device (B) 3 decrypts the hash value (Hash(D·KpC)) from the provider's electronic signature (Ca) using the provider's public key (KpA) (step S54). In addition, the intermediary device (B) 3 decrypts the hash value (Hash(D·KpC)) from the intermediator's first electronic signature (Cb) using the intermediator's public key (KpB) (step S54). Furthermore, the intermediary device (B) 3 decrypts the hash value (Hash(D·KpE+Ca+Cb)) from the first-receiver's electronic signature (Cc) that includes the provider's electronic signature (Ca) and intermediator's first electronic signature (Cb), using the first-receiver's public key (KpC) (step S54).

Then, the intermediary device (B) 3 confirms whether or not the hash value (Hash(D·KpC)) included in the transaction condition (T1), the hash value (Hash(D·KpC)) decrypted from the provider's electronic signature (Ca), and the hash value (Hash(D·KpC)) decrypted from the intermediator's first electronic signature (Cb) all match (step S55).

Moreover, the intermediary device (B) 3 confirms whether or not the hash value (Hash(D·KpE+Ca+Cb)) generated from the first encrypted data (D·KpE), provider's electronic signature (Ca), and intermediator's first electronic signature (Cb), the hash value (Hash(D·KpE+Ca+Cb)) included in the transaction condition (T1), and the hash value (Hash(D·KpE+Ca+Cb)) decrypted from the first-receiver's electronic signature (Cc) all match (step S55). The intermediary device (B) 3 can verify on the basis of matchings of these hash values all having been confirmed, that the transaction condition (T1) that has been sent is information that relates to the provided data (D) and has been directed to the intermediary device (B) 3 after passing through the providing-side terminal device (A) 1, intermediary device (B) 3, and first receiving-side terminal device (C) 2, and that its originator is the first receiving-side terminal device (C) 2 (step S55).

Next, as shown in FIG. 10, the intermediary device (B) 3 generates a hash value (Hash(D·KpE+Ca+Cb+Cc)) of a value obtained by adding the provider's electronic signature (Ca), the intermediator's first electronic signature (Cb), and the first-receiver's electronic signature (Cc) to the received first encrypted data (D·KpE), and, using this hash value (Hash(D·KpE+Ca+Cb+Cc)) and the intermediator (B)'s secret key (KsB), generates the intermediator's electronic signature (intermediator's second electronic signature) (Cb2=Hash(D·KpE+Ca+Cb+Cc)·KsB) as the second electronic signature (step S61). Then, the intermediary device (B) 3 transmits the received items of encrypted data (D·KpE, T1·KpE), provider's electronic signature (Ca), intermediator's first electronic signature (Cb), and first-receiver's electronic signature (Cc), and the generated intermediator's second electronic signature (Cb2), to the second receiving-side terminal device (E) 7 (step S61).

The second receiving-side terminal device (E) 7 decrypts the received items of encrypted data (D·KpE, T1·KpE) using the second-receiver's secret key (KsE), and obtains the provided data (D) and the transaction condition (T1) (step S62). In addition, the second receiving-side terminal device (E) 7 generates the hash values (Hash(D·KpC), Hash (D·KpE+Ca+Cb), and Hash(D·KpE+Ca+Cb+Cc)) from the obtained provided data (D) (step S63). Moreover, the second receiving-side terminal device (E) 7 generates the hash values (Hash(D·KpC) and Hash(D·KpE+Ca+Cb)) from the obtained transaction condition (T1) (step S63).

In addition, the second receiving-side terminal device (E) 7 verifies (KpA (Ca)=Hash(D·KpC)) the provider's electronic signature (Ca) with the provider's public key (KpA) to obtain the hash value (Hash(D·KpC)) (step S64). Moreover, the second receiving-side terminal device (E) 7 verifies (KpB(Cb)=Hash(D·KpC)) the intermediator's first electronic signature (Cb) with the intermediator's public key (KpB) to obtain the hash value (Hash(D·KpC)) (step S64).

In addition, the second receiving-side terminal device (E) 7 verifies (KpC (Cc)=Hash(D·KpE+Ca+Cb)) the first-receiver's electronic signature (Cc) with the first-receiver's public key (KpC) to obtain the hash value (Hash(D·KpE+ Ca+Cb)) (step S64). Furthermore, the second receiving-side terminal device (E) 7 verifies (KpB(Cb2)=Hash(D·KpE+ Ca+Cb+Cc)) the intermediator's second electronic signature (Cb2) with the intermediator's public key (KpB) to obtain the hash value (Hash(D·KpE+Ca+Cb+Cc)) (step S64).

Then, the second receiving-side terminal device (E) 7 confirms whether or not the hash value (Hash(D·KpC)) included in the transaction condition (T1), the hash value (Hash(D·KpC)) generated from the provided data (D), the hash value (Hash(D·KpC)) decrypted from the provider's electronic signature (Ca), and the hash value (Hash(D·KpC)) decrypted from the intermediator's first electronic signature (Cb) all match. In addition, the second receiving-side terminal device (E) 7 confirms whether or not the hash value (Hash(D·KpE+Ca+Cb)) included in the transaction condition (T1), the hash value (Hash(D·KpE+Ca+Cb)) found from the value obtained by adding the provider's electronic signature (Ca) and intermediator's first electronic signature (Cb) to the first encrypted data (D·KpE), and the hash value (Hash(D·KpE+Ca+Cb)) found from the first-receiver's electronic signature (Cc) all match. Furthermore, the second receiving-side terminal device (E) 7 confirms whether or not the hash value (Hash(D·KpE+Ca+Cb+Cc)) found from the value obtained by adding to the first encrypted data (D·KpE) the provider's electronic signature (Ca), intermediator's first electronic signature (Cb), and first-receiver's electronic signature (Cc), and the hash value (Hash(D·KpE+Ca+Cb+Cc)) found from the intermediator's second electronic signature (Cb2) match.

The second receiving-side terminal device (E) 7 can verify on the basis of matchings of these values all having been confirmed, that the transaction condition (T1) that has been sent is information that relates to the provided data (D) and has been directed to the second receiving-side terminal device (E) 7 after passing through the providing-side terminal device (A) 1, intermediary device (B) 3, first receiving-side terminal device (C) 2, and intermediary device (B) 3, and that its originator is the first receiving-side terminal device (C) 2 and its intermediator the intermediary device (B) 3 (step S65).

Thus, due to the present embodiment, in the case where verified results have been determined to be authentic (True in step S65), it can be determined that the provided data (D) and transaction condition (T1) are authentic, have been provided by device-to-device distribution from the first receiving-side terminal device (C) 2, and have been transmitted toward the second receiving-side terminal device (E) 7, via the intermediary device (B) 3.

On the other hand, in the case where the verified results have been determined to be inauthentic (False in step S65), it can be determined that the provided data (D) or transaction condition (T1) is inauthentic, has not been provided from the provider, has not been intermediated by the intermediator, has not been provided from the first-receiver, or has not been re-intermediated by the intermediator. In this case too, the possibility of the above-mentioned kinds of falsification or impersonation having occurred in the provided data (D) or transaction condition (T1) is high, so the second-receiver can adopt the above-mentioned various kinds of countermeasures, or attempt an investigation of the falsification, and so on.

Fourth Embodiment

[Flow of Information Intermediation of Information Intermediary System 300]

Figure 11:
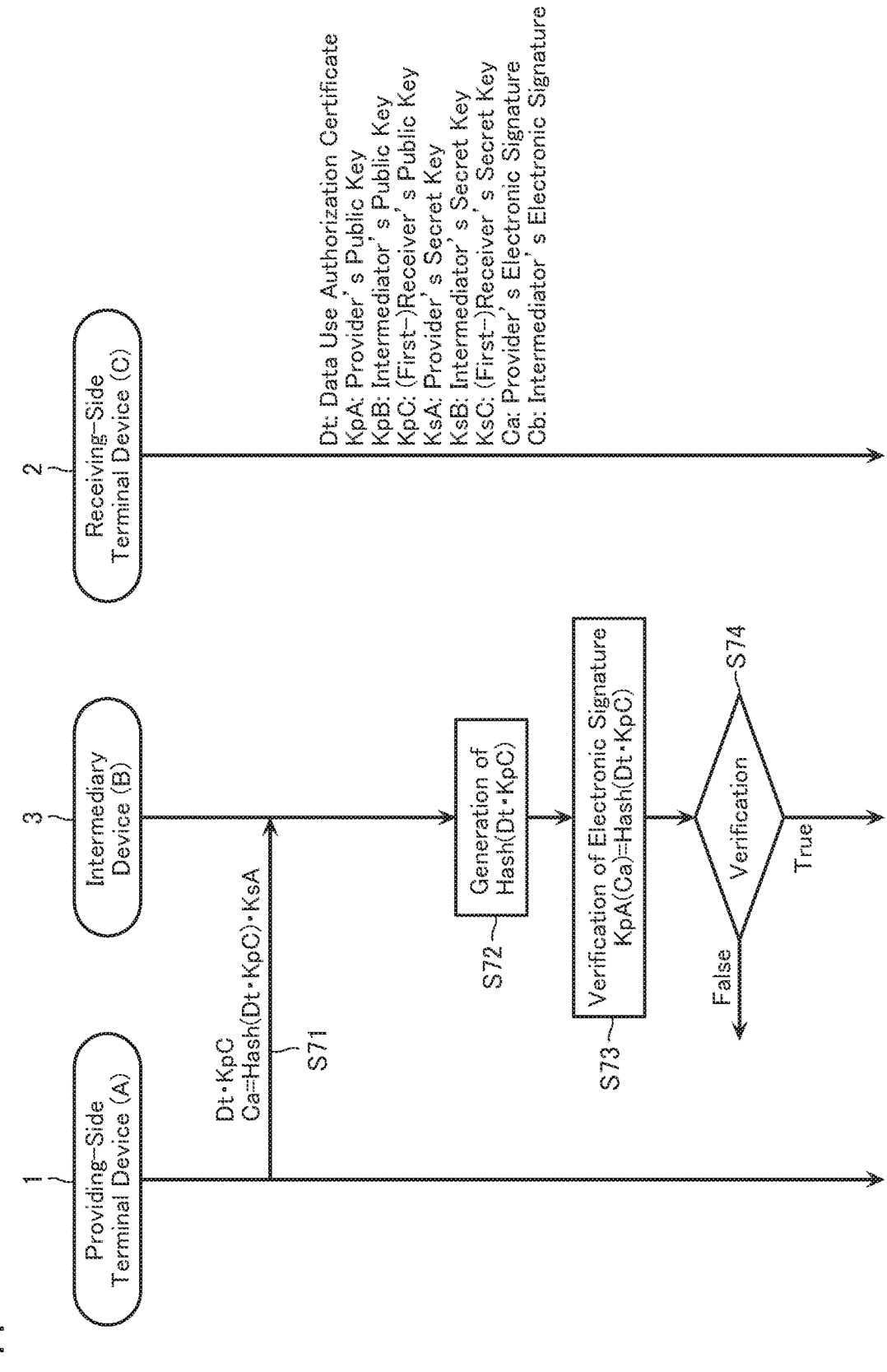
FIG. 11 is a sequence diagram showing an outline of an information intermediary system according to a fourth embodiment of the present invention.
Figure 12:
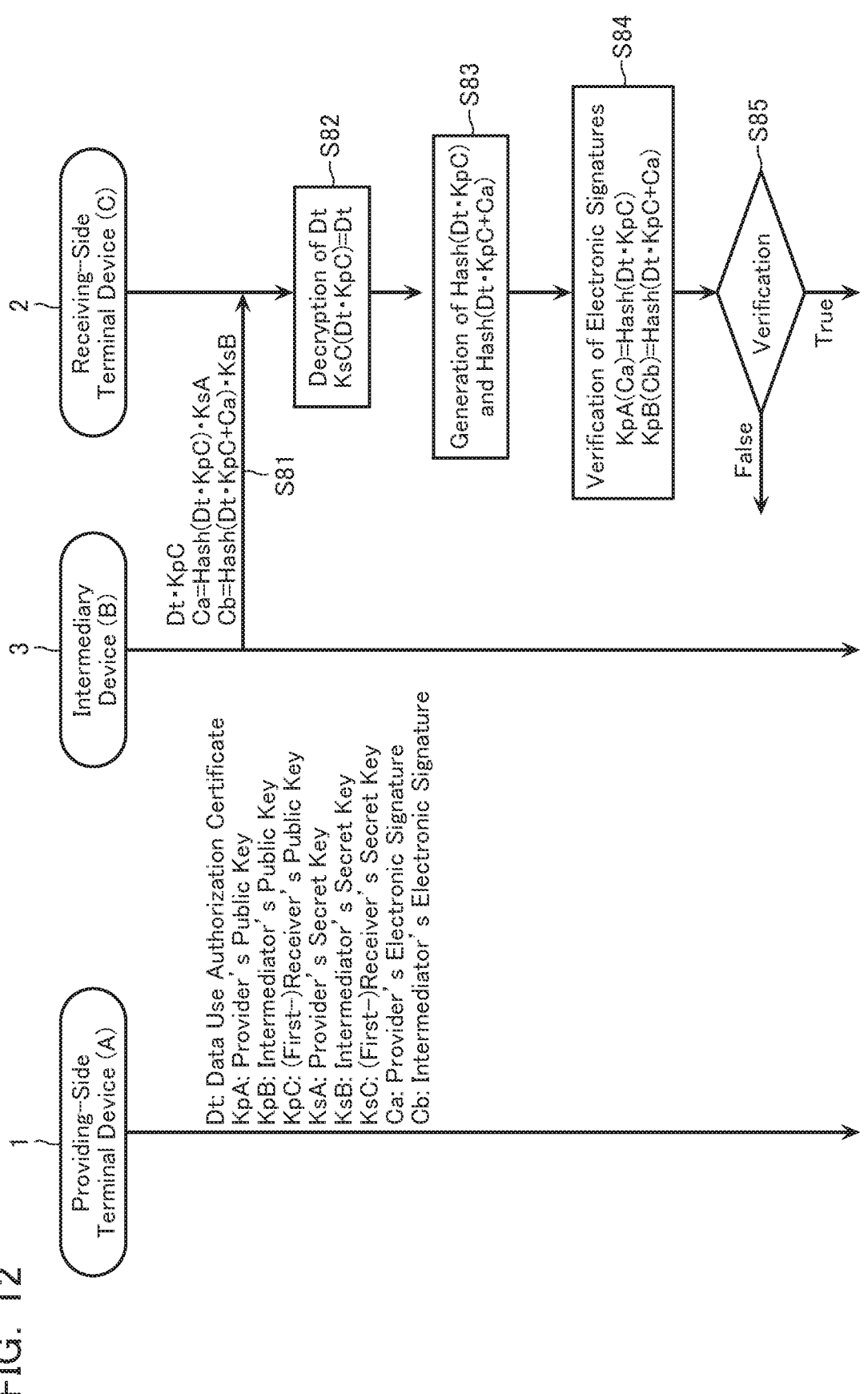
FIG. 12 is a sequence diagram showing an outline of same information intermediary system.

FIGS. 11 and 12 are sequence diagrams showing an outline of an information intermediary system according to a fourth embodiment of the present invention. Whereas in the above-mentioned first to third embodiments, there were described aspects where, in the information intermediary systems 100 to 300, the transmission information including the provided data (D) and the transaction conditions (T, T1) was sent/received, in the fourth embodiment, there will be described an aspect where a data use authorization certificate (Dt) is handled as the transmission information. Note that system configuration of the information intermediary system of the fourth embodiment is configurable similarly to in the information intermediary system 300 of the third embodiment, hence illustration thereof will be omitted.

Now, the data use authorization certificate (Dt) refers to a document defining rights pertaining to data use, that clarifies rights pertaining to data use with respect to data (the provided data D) to be distributed in a data transaction market. In other words, the data use authorization certificate (Dt) is a document clearly stating, as a contract, rights and obligations of both a provider (A) and user (receivers C, E) with respect to the data (provided data D) that is to be an object of transaction. Items contracted are, for example, data being the object of transaction, period of its provision, range/purpose of its use, and so on. Note that it is important for the data use authorization certificate (Dt) to be linked as a pair with an image of the data (provided data D) being the object of transaction. What is paired with the data use authorization certificate (Dt) at this time is an image of the data (provided data D) to be distributed. It is therefore possible for multiple issues of this combination of the image of the provided data (D) and data use authorization certificate (Dt) to be issued.

Moreover, having this number-of-issues managed by an issuer (the provider (A)) leads to the data (provided data D) being assigned exclusivity so that its rarity is managed. Moreover, by the issuer (provider (A)) and intermediator (B) electronically signing the data use authorization certificate (Dt), its history will be clarified, and there will be enabled too an independently-performed device-to-device distribution of the data use authorization certificate (Dt) when a transfer by endorsement is performed by the receivers (C, E). That is, by introducing the data use authorization certificate (Dt) into a data distribution market, and creating a data use authorization transaction market, it becomes possible for promotion of data use to be achieved.

Moreover, by introduction of the data use authorization certificate (Dt), it will be certified by a third party (the intermediator (B)) that the provider (A) itself is a valid generator of the provided data (D). Therefore, when the data (provided data D) has its value evaluated subsequent to data distribution, the provider (A) may receive an evaluation as provider of the data's original.

Moreover, it will be certified by a third party (the intermediator (B)) that the receivers (C, E) are themselves valid users of the provided data (D). Furthermore, by the data use authorization certificate (Dt) being signed by the issuer (provider (A)) and intermediator (B), its history will be clarified (traceability), so it becomes possible for device-to-device distribution to be performed safely while guaranteeing authenticity and integrity of the data.

Note that regarding a data use authorization transaction in the information intermediary system 300, what becomes important on top of there being realized the data use authorization certificate (Dt) based on the above-described kind of concept, is not just this data use authorization, but also detailed information of the data (provided data D) (information that cannot be expressed by the data itself, such as circumstances of its acquisition, or presence/absence of agreement, its measurement environment, and so on (hereafter, called "supplementary information")).

Therefore, the data use authorization transaction market ultimately presupposes that this supplementary information, the data use authorization certificate (Dt), and the provided data (D) are distributed as a set. However, the provided data (D) paired with the data use authorization certificate (Dt) need only be appropriately provided at a timepoint when the right pertaining to data use indicated in that data use authorization certificate (Dt) is exercised. Therefore, the provided data (D) does not necessarily need to exist at a timepoint of issuing of the data use authorization certificate (Dt). That is, the data use authorization certificate (Dt) may be utilized as a document capable of being issued also with respect to provided data (D) to be provided in the future and not at a current timepoint.

[Flow of Issuing of Data Use Authorization Certificate (Dt)]

Regarding issuing of the data use authorization certificate (Dt), it is presupposed that the provider of the data will issue the intermediator with the data use authorization certificate (Dt), and inform them of its content, that the intermediator will invite purchase of that data use authorization certificate (Dt) from the receiver, and that the receiver will inform the intermediator of their wish to purchase that data use authorization certificate (Dt). Note that preconditions of the likes of the public keys and secret keys, and the public key certificates with regard to handling of information are similar to in the third embodiment. Here, issuing of the data use authorization certificate (Dt) from the providing-side terminal device (A) 1 to the first receiving-side terminal device (C) 2, will be described. The transmission information that the providing-side terminal device (A) 1 provides to the first receiving-side terminal device (C) 2 includes, for example, the data use authorization certificate (Dt) of provided data (D) that has been collected, and so on, into a providable state, or provided data (D) that is due to be provided in the future. The data use authorization certificate (Dt) cannot be seen by the intermediary device (B) 3. Note that in the data use authorization certificate (Dt), various kinds of information such as the above-mentioned transaction conditions (T, T1) may be included as the supplementary information.

As shown in FIG. 11, the providing-side terminal device (A) 1 generates first encrypted data (Dt·KpC) by encrypting the data use authorization certificate (Dt) with the first-receiver's public key (KpC) (step S71). In addition, the providing-side terminal device (A) 1 generates a provider's electronic signature (Ca=Hash(Dt·KpC). KsA) being a first electronic signature, using a hash value (Hash(Dt·KpC)) obtained from the encrypted data (Dt·KpC), and using the provider's secret key (KsA) (step S71). The providing-side terminal device (A) 1 transmits the thus-generated encrypted data (Dt·KpC) and provider's electronic signature (Ca) to the intermediary device (B) 3 (step S71).

The intermediary device (B) 3 generates the hash value (Hash(Dt·KpC)) from the received encrypted data (Dt·KpC) (step S72). In addition, the intermediary device (B) 3 verifies (KpA (Ca)=Hash(Dt·KpC)) the provider's electronic signature (Ca) with the provider's public key (KpA) to obtain the hash value (Hash(Dt·KpC)) (step S73). Then, the intermediary device (B) 3 confirms whether or not the hash value (Hash(Dt·KpC)) generated from the encrypted data (Dt·KpC), and the hash value (Hash(Dt·KpC)) decrypted from the provider's electronic signature (Ca) match. The intermediary device (B) 3 can verify by the hash values (Hash(Dt·KpC)) matching, that an originator of the sent encrypted data (Dt·KpC) is the providing-side terminal device (A) 1 (step S74).

Next, as shown in FIG. 12, the intermediary device (B) 3 includes the provider's electronic signature (Ca) in the received encrypted data (Dt·KpC) to generate a hash value (Hash(Dt·KpC+Ca)), and encrypts this hash value with the intermediator (B)'s secret key (KsB) to generate an inter-mediator's electronic signature (Cb=Hash(Dt·KpC+Ca)· KsB) being a second electronic signature (step S81). Then, the intermediary device (B) 3 transmits the received encrypted data (Dt·KpC) and provider's electronic signature (Ca), and the generated intermediator's electronic signature (Cb) to the first receiving-side terminal device (C) 2 (step S81).

The first receiving-side terminal device (C) 2 decrypts the received encrypted data (Dt·KpC) using the first-receiver's secret key (KsC), and obtains the data use authorization certificate (Dt) (step S82). In addition, the first receiving-side terminal device (C) 2 generates the hash value (Hash (Dt·KpC)) and hash value (Hash(Dt·KpC+Ca)) from the obtained data use authorization certificate (Dt) (step S83). Moreover, the first receiving-side terminal device (C) 2 verifies (KpA (Ca)=Hash(Dt·KpC)) the provider's electronic signature (Ca) with the provider's public key (KpA) to obtain the hash value (Hash(Dt·KpC)) (step S84). In addition, the first receiving-side terminal device (C) 2 verifies (KpB(Cb)=Hash(Dt·KpC+Ca)) the intermediator's electronic signature (Cb) with the intermediator's public key (KpB) to obtain the hash value (Hash(Dt·KpC+Ca)) (step S84).

Then, the first receiving-side terminal device (C) 2 confirms whether or not the hash value (Hash(Dt·KpC)) generated from the data use authorization certificate (Dt), and the hash value (Hash(Dt·KpC)) decrypted from the provider's electronic signature (Ca) match. In addition, the first receiving-side terminal device (C) 2 confirms whether or not the hash value (Hash(Dt·KpC+Ca)) generated from the data use authorization certificate (Dt), and the hash value (Hash (Dt·KpC+Ca)) decrypted from the intermediator's electronic signature (Cb) match. The first receiving-side terminal device (C) 2 can verify on the basis of matchings of these having been confirmed, that the data use authorization certificate (Dt) that has been sent is information that has been directed to the first receiving-side terminal device (C) 2, and that its originator is the providing-side terminal device (A) 1 and its intermediator the intermediary device (B) 3 (step S85). In addition, the first receiving-side terminal device (C) 2 can verify there being a transaction relating to the data use authorization certificate (Dt), since the electronic signatures (Ca, Cb) that have been received by the first receiving-side terminal device (C) 2 include hash values generated from the data use authorization certificate (Dt).

Thus, due to the present embodiment, in the case where verified results have been determined to be authentic (True in step S85), it can be determined that the data use authorization certificate (Dt) is authentic, has been issued from the providing-side terminal device (A) 1, and has been transmitted toward the first receiving-side terminal device (C) 2, via the intermediary device (B) 3.

On the other hand, in the case where the verified results have been determined to be inauthentic (False in step S85), it can be determined that the data use authorization certificate (Dt) is inauthentic, has not been issued from the provider, or has not been intermediated by the intermediator, so the above-mentioned various kinds of countermeasures can be adopted, or an investigation of the falsification attempted.

Fifth Embodiment

[Flow of Purchase of Provided Data (D) by Data Use Authorization Certificate (Dt)]

Figure 13:
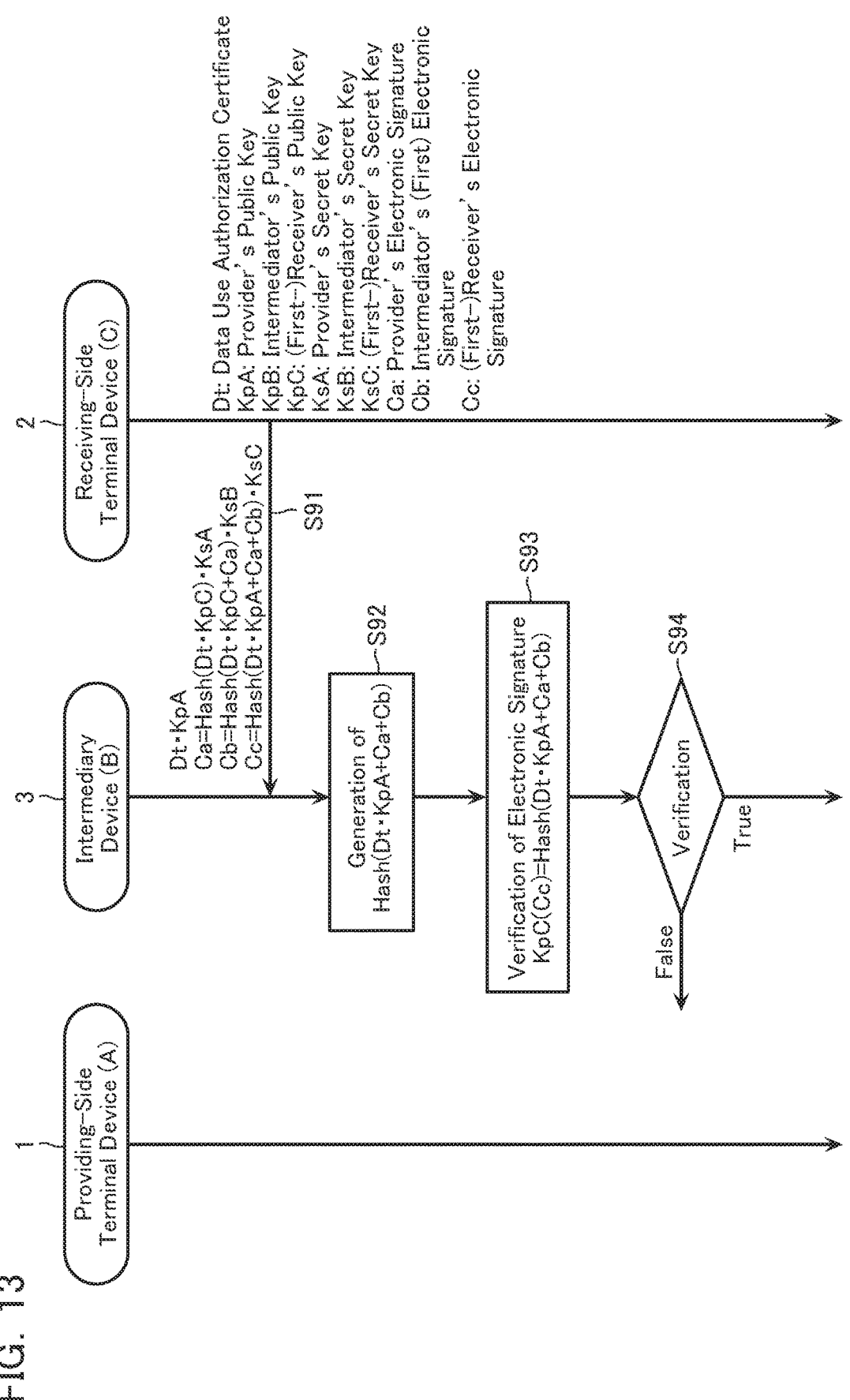
FIG. 13 is a sequence diagram showing an outline of an information intermediary system according to a fifth embodiment of the present invention.
Figure 14:
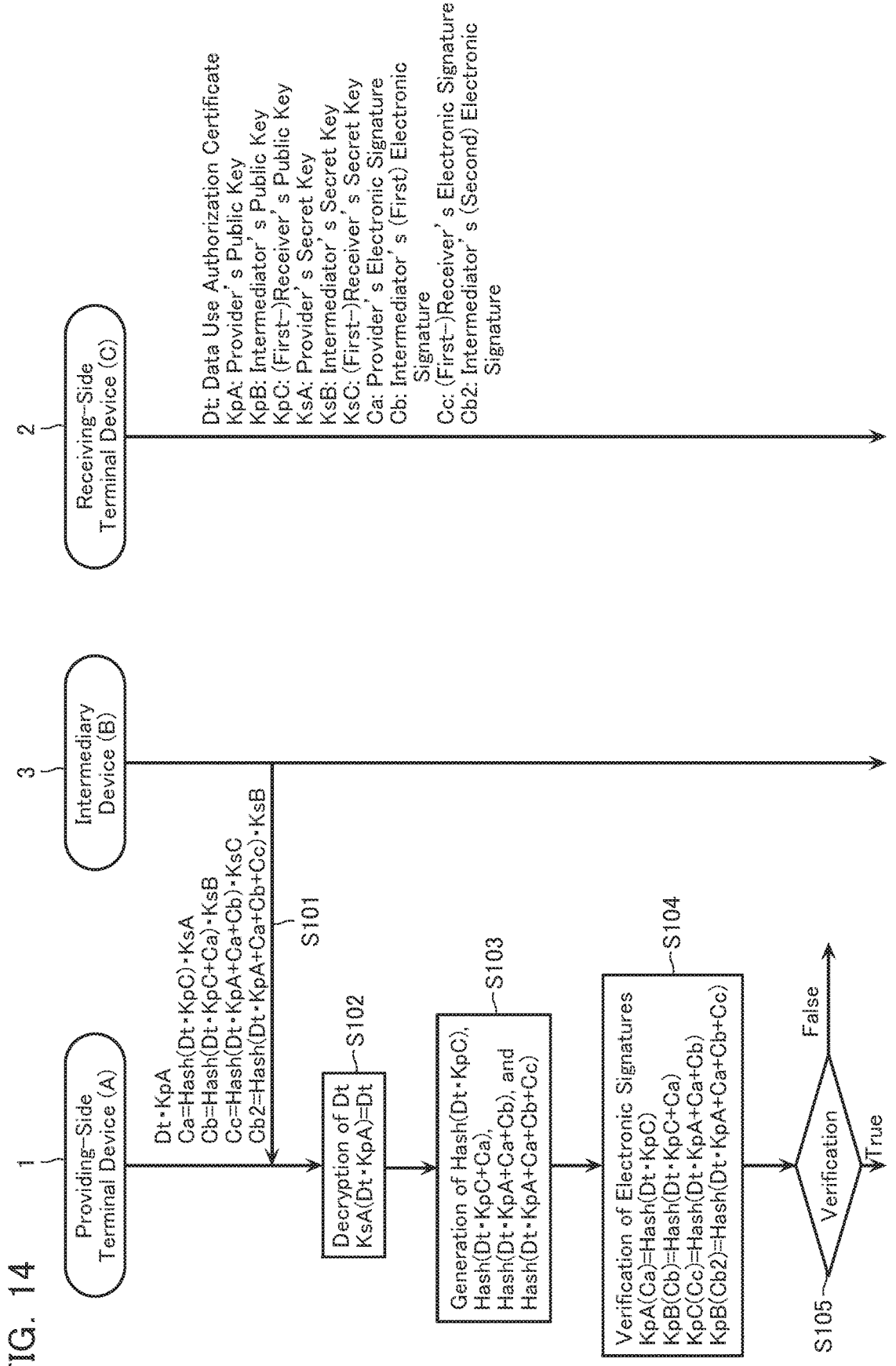
FIG. 14 is a sequence diagram showing an outline of same information intermediary system.

FIGS. 13 and 14 are sequence diagrams showing an outline of an information intermediary system according to a fifth embodiment of the present invention.

Next, there will be described an aspect of the case where the provider (A) 1 of the data use authorization certificate (Dt) is enabled to provide the provided data (D) being an object of the data use authorization certificate (Dt), for example, and the first-receiver (C) 2 purchases the provided data (D).

As shown in FIG. 13, first, the first receiving-side terminal device (C) 2 generates encrypted data (Dt·KpA) that it generates by encrypting the data use authorization certificate (Dt) with the provider's public key (KpA) (step S91). 2 includes the provider's electronic signature (Ca) and intermediator's first electronic signature (Cb) in the generated encrypted data (Dt·KpA) to generate a hash value (Hash (Dt·KpA+Ca+Cb)), and, using this hash value (Hash (Dt·KpA+Ca+Cb)) and the first-receiver (C) 2's secret key (KsC), generates a first-receiver's electronic signature (Cc=Hash(Dt·KpA+Ca+Cb)·KsC) being a first electronic signature (step S91). The first receiving-side terminal device (C) 2 transmits the generated first-receiver's electronic signature (Cc) along with the encrypted data (Dt·KpA), provider's electronic signature (Ca), and intermediator's first electronic signature (Cb), to the intermediary device (B) 3 (step S91).

The intermediary device (B) 3 generates the hash value (Hash(Dt·KpA+Ca+Cb)) from the received encrypted data (Dt·KpA), provider's electronic signature (Ca), and intermediator's electronic signature (Cb) (step S92). In addition, the intermediary device (B) 3 obtains the hash value (Hash (Dt·KpA+Ca+Cb)) from the first-receiver's electronic signature (Cc), using the first-receiver's public key (KpC) (step S93).

Then, the intermediary device (B) 3 confirms whether or not the hash value (Hash(Dt·KpA+Ca+Cb)) generated from the encrypted data (Dt·KpA), provider's electronic signature (Ca), and intermediator's electronic signature (Cb), and the hash value (Hash(Dt·KpA+Ca+Cb)) decrypted from the first-receiver's electronic signature (Cc) match.

The intermediary device (B) 3 can verify by the hash values (Hash(Dt·KpA+Ca+Cb)) matching, that the sent encrypted data (Dt·KpA) has been originally sent from the providing-side terminal device (A) 1 (step S94).

Next, as shown in FIG. 14, the intermediary device (B) 3 includes the provider's electronic signature (Ca), intermediator's first electronic signature (Cb), and first-receiver's electronic signature (Cc) in the received encrypted data (Dt·KpA) to generate a hash value (Hash(Dt·KpA+Ca+Cb+ Cc)), and, using the obtained hash value (Hash(Dt·KpA+ Ca+Cb+Cc)) and the intermediator's secret key (KsB), generates a intermediator's second electronic signature (Cb2=Hash(Dt·KpA+Ca+Cb+Cc)·KsB) being a second electronic signature (step S101). Then, the intermediary device (B) 3 transmits the generated intermediator's second electronic signature (Cb2) along with the received encrypted data (Dt·KpA), provider's electronic signature (Ca), intermediator's first electronic signature (Cb), and first-receiver's electronic signature (Cc), to the providing-side terminal device (A) 1 (step S101).

The providing-side terminal device (A) 1 decrypts the received encrypted data (Dt·KpA) using the provider's secret key (KsA), and obtains the data use authorization certificate (Dt) (step S102). In addition, the providing-side terminal device (A) 1 generates the hash values (Hash (Dt·KpC), Hash(Dt·KpC+Ca), Hash(Dt·KpA+Ca+Cb), and Hash(Dt·KpA+Ca+Cb+Cc)) from the obtained data use authorization certificate (Dt) (step S103).

Moreover, the providing-side terminal device (A) 1 verifies (KpA (Ca)=Hash(Dt·KpC)) the provider's electronic signature (Ca) with the provider's public key (KpA) to obtain the hash value (Hash(Dt·KpC)) (step S104). In addition, the providing-side terminal device (A) 1 verifies (KpB (Cb)=Hash(Dt·KpC+Ca)) the intermediator's first electronic signature (Cb) with the intermediator's public key (KpB) to obtain the hash value (Hash(Dt·KpC+Ca)) (step S104).

Moreover, the providing-side terminal device (A) 1 verifies (KpB(Cc)=Hash(Dt·KpA+Ca+Cb)) the first-receiver's electronic signature (Cc) with the first-receiver's public key (KpC) to obtain the hash value (Hash(Dt·KpA+Ca+Cb)) (step S104). Furthermore, the providing-side terminal device (A) 1 verifies (KpB(Cb2)=Hash(Dt·KpA+Ca+Cb+ Cc)) the intermediator's second electronic signature (Cb2) with the intermediator's public key (KpB) to obtain the hash value (Hash(Dt·KpA+Ca+Cb+Cc)) (step S104).

Then, the providing-side terminal device (A) 1 confirms whether or not the hash value (Hash(Dt·KpC)) generated from the data use authorization certificate (Dt) and hash value (Hash(Dt·KpC)) decrypted from the provider's electronic signature (Ca) match, whether or not the hash value (Hash(Dt·KpC+Ca)) generated from the data use authorization certificate (Dt) and provider's electronic signature (Ca), and hash value (Hash(Dt·KpC+Ca)) decrypted from the intermediator's first electronic signature (Cb) match, whether or not the hash value (Hash(Dt·KpA+Ca+Cb))

generated from the data use authorization certificate (Dt), provider's electronic signature (Ca), and intermediator's first electronic signature (Cb), and hash value (Hash (Dt·KpA+Ca+Cb)) decrypted from the first-receiver's electronic signature (Cc) match, and whether or not the hash value (Hash(Dt·KpA+Ca+Cb+Cc)) generated from the data use authorization certificate (Dt), provider's electronic signature (Ca), intermediator's first electronic signature (Cb), and first-receiver's electronic signature (Cc), and hash value (Hash(Dt·KpA+Ca+Cb+Cc)) decrypted from the intermediator's second electronic signature (Cb2) match.

The providing-side terminal device (A) 1 can verify on the basis of matchings of these values all having been confirmed, that the data use authorization certificate (Dt) that has been sent is information that has been directed to the providing-side terminal device (A) 1 after passing through the providing-side terminal device (A) 1, intermediary device (B) 3, first receiving-side terminal device (C) 2, and intermediary device (B) 3, and that its originator is the first receiving-side terminal device (C) 2 and its intermediator the intermediary device (B) 3 (step S105).

Thus, due to the present embodiment, in the case where verified results have been determined to be authentic (True in step S105), it can be determined that the data use authorization certificate (Dt) is authentic, has been provided from the providing-side terminal device (A) 1, and has been re-transmitted toward the providing-side terminal device (A) 1, via the intermediary device (B) 3, first receiving-side terminal device (C) 2, and intermediary device (B) 3.

On the other hand, in the case where the verified results have been determined to be inauthentic (False in step S105), it can be determined that the data use authorization certificate (Dt) is inauthentic, has not been provided from the provider, has not been intermediated by the intermediator, or has not been originally sent from the first-receiver, so the above-mentioned various kinds of countermeasures can be adopted, or an investigation of the falsification attempted. Note that subsequent to the providing-side terminal device (A) 1 having received the authentic data use authorization certificate (Dt) from the first receiving-side terminal device (C) 2, the providing-side terminal device (A) 1 may transfer the provided data (D) to the first receiving-side terminal device (C) 2, in accordance with the flow described in the first embodiment. It thus becomes possible for the first receiving-side terminal device (C) 2 to purchase the provided data (D) from the providing-side terminal device (A) 1.

Sixth Embodiment

[Flow of Distribution of Provided Data Set (Dset)]

Figure 16:
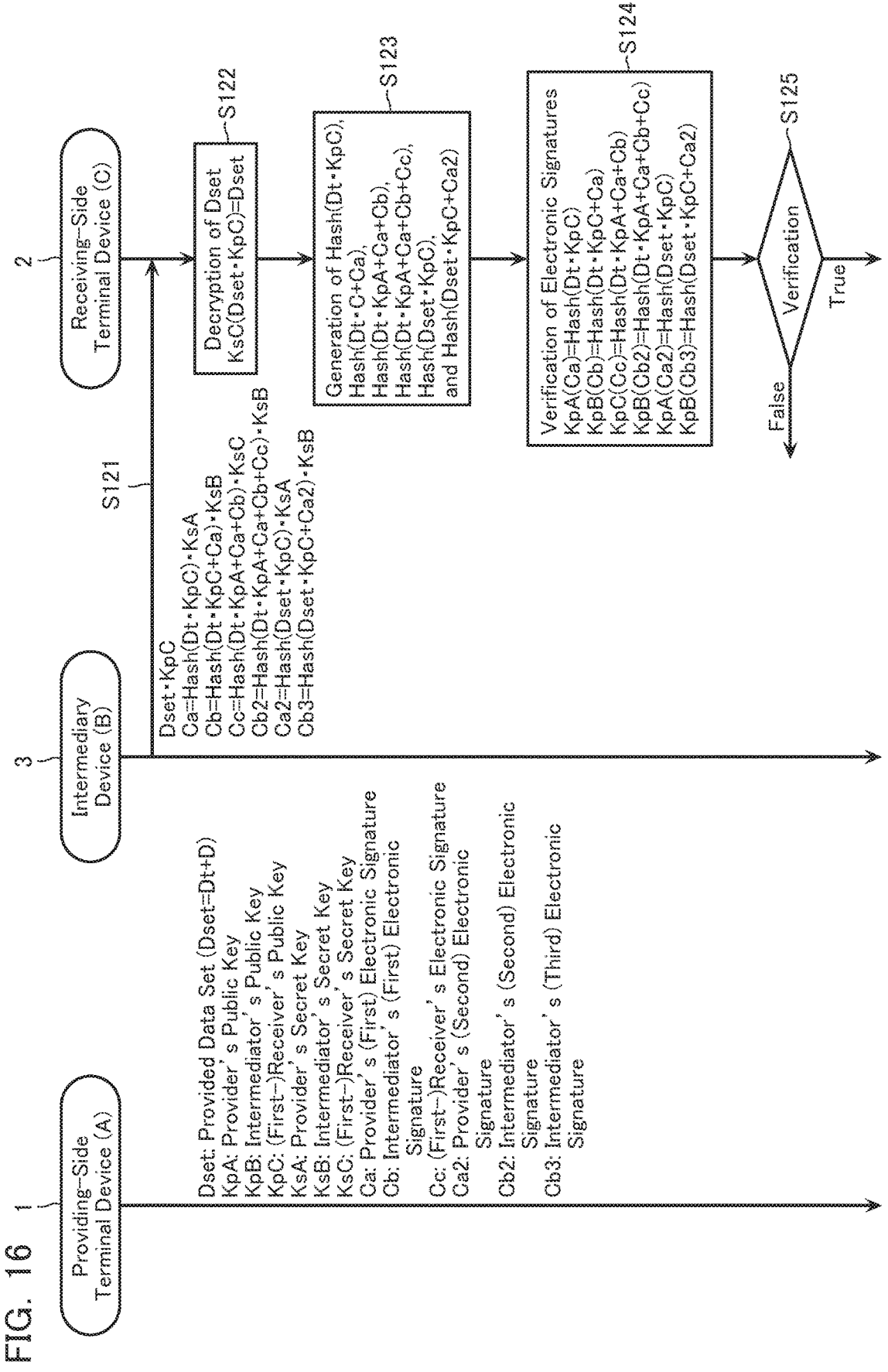
FIG. 16 is a sequence diagram showing an outline of same information intermediary system.

FIGS. 15 and 16 are sequence diagrams showing an outline of an information intermediary system according to a sixth embodiment of the present invention.

There will herein be described an aspect of the case where subsequent to the provider (A) 1 of the data use authorization certificate (Dt) having received the authentic data use authorization certificate (Dt) from the first-receiver (C) 2, the provider (A) 1 links the provided data (D) to the data use authorization certificate (Dt) to provide these to the first-receiver (C) 2 as a single provided data set (Dset=Dt+D), for example.

As shown in FIG. 15, the providing-side terminal device (A) 1 generates encrypted data (Dset·KpC) that it generates by encrypting the provided data set (Dset) with the first-receiver's public key (KpC) (step S111). In addition, the providing-side terminal device (A) 1 generates a provider's second electronic signature (Ca2=Hash(Dset·KpC). KsA) being a first electronic signature, using a hash value (Hash (Dset·KpC)) obtained from the encrypted data (Dset·KpC), and using the provider's secret key (KsA) (step S111). The providing-side terminal device (A) 1 transmits the thus-generated encrypted data (Dset·KpC) and provider's second electronic signature (Ca2), along with the provider's electronic signature (provider's first electronic signature) (Ca), intermediator's first electronic signature (Cb), first-receiver's electronic signature (Cc), and intermediator's second electronic signature (Cb2), to the intermediary device (B) 3 (step S111).

The intermediary device (B) 3 generates the hash value (Hash(Dset·KpC)) from the received encrypted data (Dset·KpC) (step S112). In addition, the intermediary device (B) 3 obtains the hash value (Hash(Dset·KpC)) by verifying (KpA (Ca2)=Hash(Dset·KpC)) the provider's second electronic signature (Ca2) with the provider's public key (KpA) (step S113).

Then, the intermediary device (B) 3 confirms whether or not the hash value (Hash(Dset·KpC)) generated from the encrypted data (Dset·KpC), and the hash value (Hash (Dset·KpC)) decrypted from the provider's second electronic signature (Ca2) match.

The intermediary device (B) 3 can verify by the hash values (Hash(Dset·KpC)) matching, that the originator of the sent encrypted data (Dset·KpC) is the providing-side terminal device (A) 1 (step S114).

Next, as shown in FIG. 16, the intermediary device (B) 3 includes the provider's second electronic signature (Ca2) in the received encrypted data (Dset·KpC) to generate a hash value (Hash(Dset·KpC+Ca2)), and, using this hash value (Hash(Dset·KpC+Ca2)) and the intermediator's secret key (KsB), generates an intermediator's third electronic signature (Cb3=Hash(Dset·KpC+Ca2)·KsB) being a second electronic signature (step S121). Then, the intermediary device (B) 3 transmits the received encrypted data (Dset·KpC) and generated intermediator's third electronic signature (Cb3) along with the provider's first electronic signature (Ca), intermediator's first electronic signature (Cb), first-receiver's electronic signature (Cc), intermediator's second electronic signature (Cb2), and provider's second electronic signature (Ca2), to the first receiving-side terminal device (C) 2 (step S121).

The first receiving-side terminal device (C) 2 decrypts the received encrypted data (Dset·KpC) using the first-receiver's secret key (KsC), and obtains the provided data set (Dset) (step S122). In addition, the first receiving-side terminal device (C) 2 generates the hash values (Hash (Dt·KpC), Hash(Dt·KpC+Ca), Hash(Dt·KpA+Ca+Cb), Hash(Dt·KpA+Ca+Cb+Cc), Hash(Dset·KpC), and Hash (Dset·KpC+Ca2)) from the obtained provided data set (Dset) (step S123).

Moreover, the first receiving-side terminal device (C) 2 verifies (KpA (Ca)=Hash(Dt·KpC)) the provider's first electronic signature (Ca) with the provider's public key (KpA) to obtain the hash value (Hash(Dt·KpC)) (step S124). In addition, the first receiving-side terminal device (C) 2 verifies (KpB(Cb)=Hash(Dt·KpC+Ca)) the intermediator's first electronic signature (Cb) with the intermediator's public key (KpB) to obtain the hash value (Hash(Dt·KpC+Ca)) (step S124).

Moreover, the first receiving-side terminal device (C) 2 verifies (KpC (Cc)=Hash(Dt·KpA+Ca+Cb)) the first-receiver's electronic signature (Cc) with the first-receiver's public key (KpC) to obtain the hash value (Hash(Dt·KpA+Ca+Cb)) (step S124). 2 verifies (KpB(Cb2)=Hash(Dt·KpA+Ca+Cb+

Cc)) the intermediator's second electronic signature (Cb2) with the intermediator's public key (KpB) to obtain the hash value (Hash(Dt·KpA+Ca+Cb+Cc)) (step S124).

Moreover, the first receiving-side terminal device (C) 2 verifies (KpA(Ca2)=Hash(Dset·KpC)) the provider's second electronic signature (Ca2) with the provider's public key (KpA) to obtain the hash value (Hash(Dset·KpC)) (step S124). Furthermore, the first receiving-side terminal device (C) 2 verifies (KpB(Cb3)=Hash(Dset·KpC+Ca2)) the inter-mediator's third electronic signature (Cb3) with the inter-mediator's public key (KpB) to obtain the hash value (Hash(Dset·KpC+Ca2)) (step S124).

Then, the first receiving-side terminal device (C) 2 con-firms whether or not the hash values (Hash(Dt·KpC), Hash (Dt·KpC+Ca), Hash(Dt·KpA+Ca+Cb), Hash(Dt·KpA+Ca+Cb+Cc), Hash(Dset·KpC), and Hash(Dset·KpC+Ca2)) generated from the provided data set (Dset), and the hash values (Hash(Dt·KpC), Hash(Dt·KpC+Ca), Hash(Dt·KpA+Ca+Cb), Hash(Dt·KpA+Ca+Cb+Cc), Hash(Dset·KpC), and Hash(Dset·KpC+Ca2)) decrypted from the electronic signa-tures (Ca, Cb, Cc, Cb2, Ca2, and Cb3) respectively match.

The first receiving-side terminal device (C) 2 can verify on the basis of matchings of these values all having been confirmed, that the provided data set (Dset) that has been sent is information that has been directed to the first receiv-ing-side terminal device (C) 2, and that its originator is the providing-side terminal device (A) 1 and its intermediator the intermediary device (B) 3 (step S125).

Thus, due to the present embodiment, in the case where verified results have been determined to be authentic (True in step S125), it can be determined that the provided data set (Dset) is authentic, has been provided from the providing-side terminal device (A) 1, and has been transmitted toward the first receiving-side terminal device (C) 2, via the inter-mediary device (B) 3, and that it has been transmitted toward the first receiving-side terminal device (C) 2 after passing through the providing-side terminal device (A) 1, interme-diary device (B) 3, first receiving-side terminal device (C) 2, intermediary device (B) 3, providing-side terminal device (A) 1, and intermediary device (B) 3.

On the other hand, in the case where the verified results have been determined to be inauthentic (False in step S125), it can be determined that the provided data set (Dset) is inauthentic, has not been provided from the provider, has not been intermediated by the intermediator, or has not been originally sent from the provider and received by the first-receiver following the above-described kind of route, so the above-mentioned various kinds of countermeasures can be adopted, or an investigation of the falsification attempted.

Seventh Embodiment

[Flow of Transfer of Data Use Authorization Certificate (Dt)]

Figure 17:
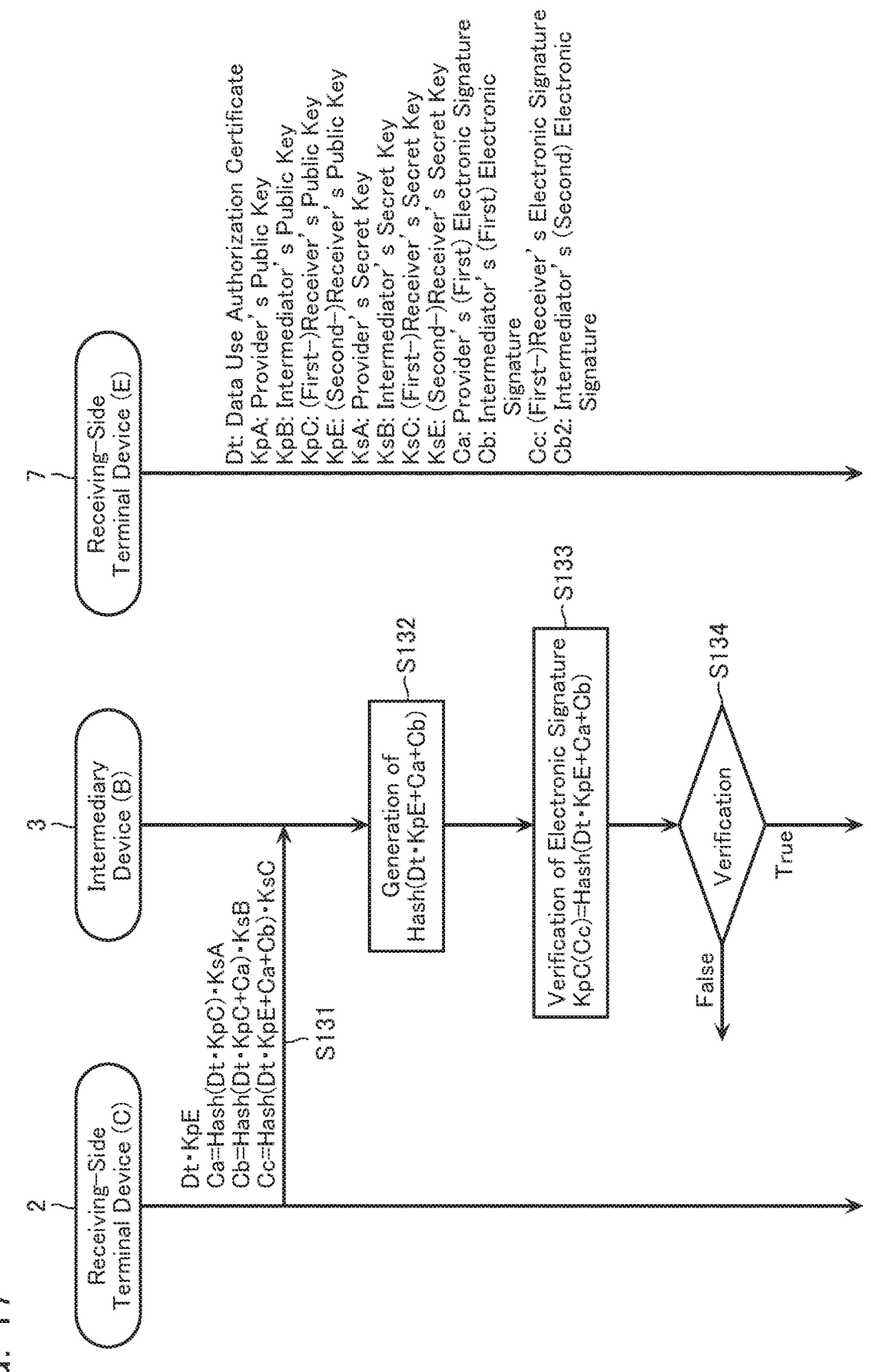
FIG. 17 is a sequence diagram showing an outline of an information intermediary system according to a seventh embodiment of the present invention.
Figure 18:
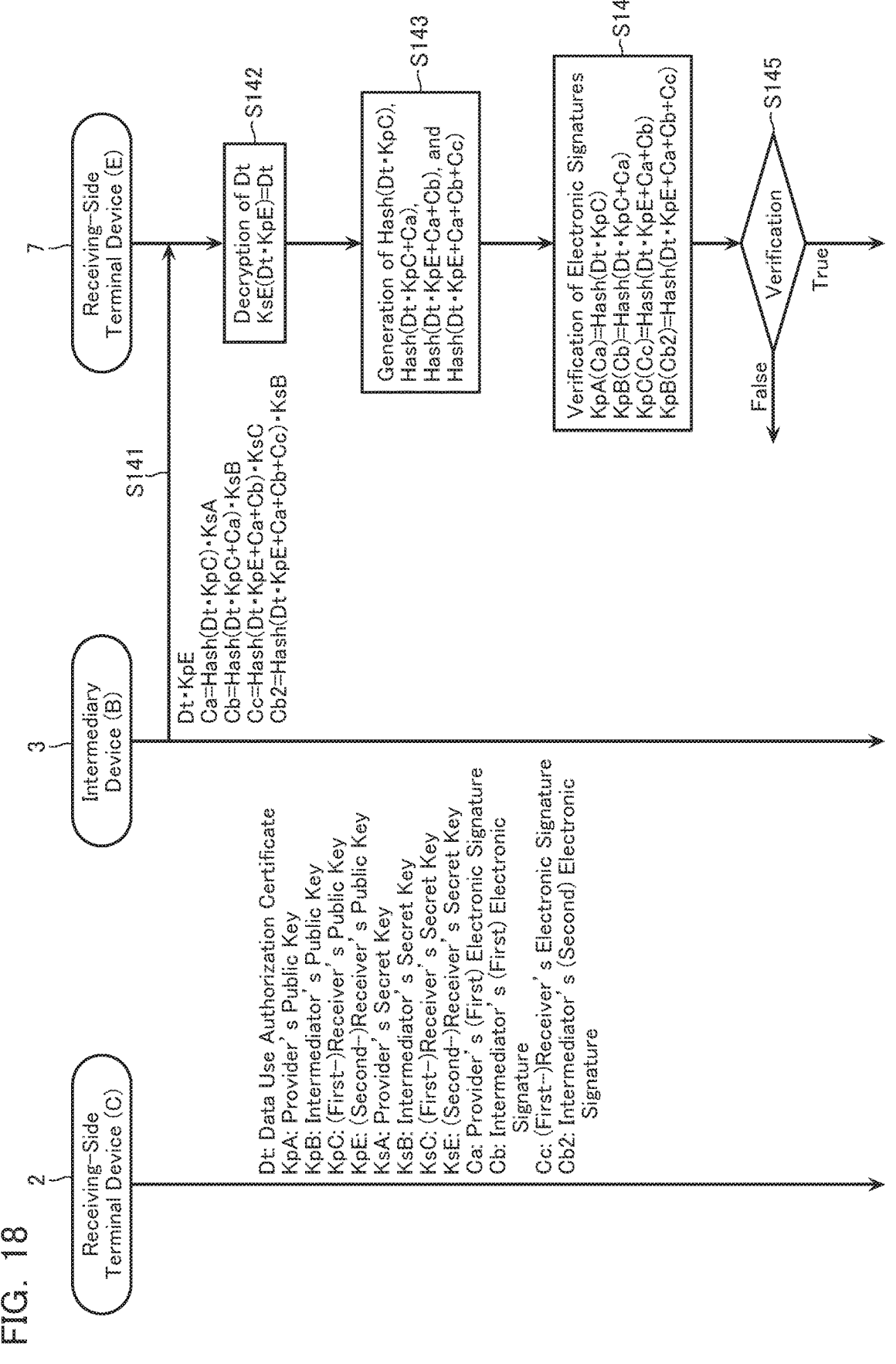
FIG. 18 is a sequence diagram showing an outline of same information intermediary system.

FIGS. 17 and 18 are sequence diagrams showing an outline of an information intermediary system according to a seventh embodiment of the present invention.

There will herein be described an aspect of the case where the data use authorization certificate (Dt) is independently transferred from the first-receiver (C) 2 to the second-receiver (E) 7.

As shown in FIG. 17, first, the first receiving-side terminal device (C) 2 generates encrypted data (Dt·KpE) by encrypt-ing the data use authorization certificate (Dt) with the second-receiver's public key (KpE) (step S131).

In addition, the first receiving-side terminal device (C) 2 finds a hash value (Hash(Dt·KpE+Ca+Cb)) of a value obtained upon the provider's first electronic signature (Ca) and intermediator's first electronic signature (Cb) having been included in the encrypted data (Dt·KpE), and, using this hash value (Hash(Dt·KpE+Ca+Cb)) and the secret key (KsC) of the first-receiver being the provider in this case, generates a first-receiver's electronic signature (Cc-Hash (Dt·KpE+Ca+Cb)·KsC) (step S131). The first receiving-side terminal device (C) 2 transmits the thus-generated encrypted data (Dt·KpE), provider's first electronic signature (Ca), intermediator's first electronic signature (Cb), and first-receiver's electronic signature (Cc), to the intermediary device (B) 3 (step S131).

The intermediary device (B) 3 generates the hash value (Hash(Dt·KpE+Ca+Cb)) from the received encrypted data (Dt·KpE), provider's first electronic signature (Ca), and intermediator's first electronic signature (Cb) (step S132). In addition, the intermediary device (B) 3 uses the first-receiv-er's public key (KpC) to decrypt the hash value (Hash (Dt·KpE+Ca+Cb)) from the first-receiver's electronic sig-nature (Cc) that includes the provider's first electronic signature (Ca) and intermediator's first electronic signature (Cb) (step S133).

Then, the intermediary device (B) 3 confirms whether or not the hash value (Hash(Dt·KpE+Ca+Cb)) generated from the encrypted data (Dt·KpE), and the hash value (Hash (Dt·KpE+Ca+Cb)) decrypted from the first-receiver's elec-tronic signature (Cc) match.

The intermediary device (B) 3 can verify by the hash values (Hash(Dt·KpE+Ca+Cb)) matching, that the origina-tor of the sent encrypted data (Dt·KpE) is the first receiving-side terminal device (C) 2 (step S134).

Next, as shown in FIG. 18, the intermediary device (B) 3 includes the provider's first electronic signature (Ca), inter-mediator's first electronic signature (Cb), and first-receiver's electronic signature (Cc) in the received encrypted data (Dt·KpE) to generate a hash value (Hash(Dt·KpE+Ca+Cb+ Cc)), and, using this hash value (Hash(Dt·KpE+Ca+Cb+ Cc)) and the intermediator's secret key (KsB), generates a intermediator's second electronic signature (Cb2=Hash (Dt·KpE+Ca+Cb+Cc)·KsB) (step S141).

Then, the intermediary device (B) 3 transmits the received encrypted data (Dt·KpE) and generated intermediator's sec-ond electronic signature (Cb2) along with the provider's first electronic signature (Ca), intermediator's first electronic signature (Cb), and first-receiver's electronic signature (Cc), to the second receiving-side terminal device (E) 7 (step S141).

The second receiving-side terminal device (E) 7 decrypts the received encrypted data (Dt·KpE) using the second-receiver's secret key (KsE), and obtains the data use autho-rization certificate (Dt) (step S142). In addition, the second receiving-side terminal device (E) 7 generates the hash values (Hash(Dt·KpC), Hash(Dt·KpC+Ca), Hash(Dt·KpE+ Ca+Cb), and Hash(Dt·KpE+Ca+Ch+Cc)) from the obtained data use authorization certificate (Dt) (step S143).

Moreover, the second receiving-side terminal device (E) 7 verifies (KpA (Ca)=Hash(Dt·KpC)) the provider's first electronic signature (Ca) with the provider's public key (KpA) to obtain the hash value (Hash(Dt·KpC)) (step S144). In addition, the second receiving-side terminal device (E) 7 verifies (KpB(Cb)=Hash(Dt·KpC+Ca)) the intermediator's first electronic signature (Cb) with the intermediator's public key (KpB) to obtain the hash value (Hash(Dt·KpC+Ca)) (step S144).

Moreover, the second receiving-side terminal device (E) 7 verifies (KpC (Cc)=Hash(Dt·KpE+Ca+Cb)) the first-receiver's electronic signature (Cc) with the first-receiver's public key (KpC) to obtain the hash value (Hash(Dt·KpE+Ca+Cb)) (step S144).

Furthermore, the second receiving-side terminal device (E) 7 verifies (KpB(Cb2)=Hash(Dt·KpE+Ca+Cb+Cc)) the intermediator's second electronic signature (Cb2) with the intermediator's public key (KpB) to obtain the hash value (Hash(Dt·KpE+Ca+Cb+Cc)) (step S144).

Then, the second receiving-side terminal device (E) 7 confirms whether or not the hash values (Hash(Dt·KpC), Hash(Dt·KpC+Ca), Hash(Dt·KpE+Ca+Cb), and Hash (Dt·KpE+Ca+Cb+Cc)) generated from the data use authorization certificate (Dt), and the hash values (Hash(Dt·KpC), Hash(Dt·KpC+Ca), Hash(Dt·KpE+Ca+Cb), and Hash (Dt·KpE+Ca+Cb+Cc)) decrypted from the electronic signatures (Ca, Cb, Cc, and Cb2) respectively match.

The second receiving-side terminal device (E) 7 can verify on the basis of matchings of these values all having been confirmed, that the data use authorization certificate (Dt) that has been sent is information that has been directed to the second receiving-side terminal device (E) 7 after passing through the providing-side terminal device (A) 1, intermediary device (B) 3, first receiving-side terminal device (C) 2, and intermediary device (B) 3, and that its originator is the first receiving-side terminal device (C) 2 and its intermediator the intermediary device (B) 3 (step S145).

Thus, due to the present embodiment, in the case where verified results have been determined to be authentic (True in step S145), it can be determined that the data use authorization certificate (Dt) is authentic, has been provided due to transfer (device-to-device distribution) from the first receiving-side terminal device (C) 2 after following the above-described route, and has been transmitted toward the second receiving-side terminal device (E) 7, via the intermediary device (B) 3.

On the other hand, in the case where the verified results have been determined to be inauthentic (False in step S145), it can be determined that the data use authorization certificate (Dt) is inauthentic, has not been provided from the provider, has not been intermediated by the intermediator, has not been provided from the first-receiver, or has not been re-intermediated by the intermediator, and so on. In this case too, the possibility of the above-mentioned kinds of falsification or impersonation having occurred in the data use authorization certificate (Dt) is high, so the second-receiver can adopt various kinds of countermeasures, or attempt an investigation of the falsification.

Note that in the third to seventh embodiments, a configuration may be adopted whereby the transmitted provided data (D), transaction condition (T1), data use authorization certificate (Dt), provided data set (Dset), and electronic signatures (Ca, Cb, Cc, Cb2, Ca2, and so on) include a time-stamp, as in the second embodiment.

While certain embodiments have been described, these embodiments have been presented by way of example only, and are not intended to limit the scope of the inventions. Indeed, the novel methods and systems described herein may be embodied in a variety of other forms: furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

DESCRIPTION OF REFERENCE NUMERALS

1 providing-side terminal device (A)
2 receiving-side terminal device (C)

3 intermediary device (B)
4 public key certificate authority (CA)
5 network
6 time stamping authority (TSA)
7 receiving-side terminal device (E)
100, 200, 300 information intermediary system

The invention claimed is:

1. An information intermediary system comprising:
a providing-side terminal device which transmits transmission information that includes provided data;
a receiving-side terminal device that receives the transmission information; and
an intermediary device that intermediates transfer of the transmission information between the providing-side terminal device and the receiving-side terminal device,
wherein the providing-side terminal device is assigned with a first public key and a first secret key,
the intermediary device is assigned with a second public key and a second secret key, and
the receiving-side terminal device is assigned with a third public key and a third secret key, and
the providing-side terminal device generates first encrypted data by encrypting the provided data with the third public key, and also generates a first electronic signature using the first secret key, and transmits the first encrypted data and the first electronic signature to the intermediary device,
the intermediary device generates a second electronic signature using the second secret key, and transmits the first encrypted data, the first electronic signature, and the second electronic signature to the receiving-side terminal device, and
the receiving-side terminal device decrypts the first encrypted data with the third secret key to obtain the provided data, and also verifies the first electronic signature with the first public key and verifies the second electronic signature with the second public key, wherein
the transmission information includes first data which is to be provided only to the receiving-side terminal device, and second data which is to be provided to the intermediary device and the receiving-side terminal device, and
the providing-side terminal device generates the first encrypted data by encrypting the first data with the third public key, generates first time-authenticated data by adding to the second data a first time-stamp obtained from a time stamping authority, generates second encrypted data by encrypting the first time-authenticated data with the second public key, and transmits the first and second encrypted data to the intermediary device, and
the intermediary device decrypts the second encrypted data using the second secret key.

2. The information intermediary system according to claim 1, wherein
the providing-side terminal device generates the first electronic signature by encrypting with the first secret key a hash value obtained by rendering the first encrypted data as a one-way function, and
the intermediary device generates the second electronic signature by encrypting with the second secret key the hash value obtained by rendering the first encrypted data as a one-way function.

3. The information intermediary system according to claim 2, wherein the receiving-side terminal device determines authenticity of the transmission information based on whether or not a computed result of rendering the first encrypted data as the one-way function, a decrypted result of decrypting the first electronic signature with the first public key, and a decrypted result of decrypting the second electronic signature with the second public key, are equal.

4. The information intermediary system according to claim 1, wherein the providing-side terminal device generates the first electronic signature by encrypting with the first secret key a hash value obtained by rendering the second encrypted data as a one-way function, and the intermediary device generates second time-authenticated data by adding to the first time-authenticated data obtained by decrypting the second encrypted data a second time-stamp obtained from the time stamping authority, generates third encrypted data by encrypting the second time-authenticated data with the third public key, and generates the second electronic signature by encrypting with the second secret key a hash value obtained by rendering the third encrypted data as a one-way function.

5. The information intermediary system according to claim 4, wherein the receiving-side terminal device decrypts the second time-authenticated data from the third encrypted data, separates the first time-authenticated data from the second time-authenticated data, and determines authenticity of the transmission information based on whether or not a computed result of rendering the first and second time-authenticated data as the one-way function, a decrypted result of decrypting the first electronic signature with the first public key, and a decrypted result of decrypting the second electronic signature with the second public key, are equal, and on a verification result by the time stamping authority of the first and second time-stamps included in the second time-authenticated data.

6. An information intermediary method in an information intermediary system, the information intermediary system comprising:

a providing-side terminal device which transmits transmission information that includes provided data;

a receiving-side terminal device that receives the transmission information; and an intermediary device that intermediates transfer of the transmission information between the providing-side terminal device and the receiving-side terminal device, the information intermediary method including:

assigning a first public key and a first secret key to the providing-side terminal device;

assigning a second public key and a second secret key to the intermediary device;

assigning a third public key and a third secret key to the receiving-side terminal device;

using the providing-side terminal device to generate first encrypted data by encrypting the provided data with the third public key, and also to generate a first electronic signature using the first secret key, and to transmit the first encrypted data and the first electronic signature to the intermediary device;

using the intermediary device to generate a second electronic signature using the second secret key, and to transmit the first encrypted data, the first electronic signature to the intermediary device;

signature, and the second electronic signature to the receiving-side terminal device; and using the receiving-side terminal device to decrypt the first encrypted data with the third secret key and thereby obtain the provided data, and also to verify the first electronic signature with the first public key and to verify the second electronic signature with the second public key, wherein the transmission information includes first data which is to be provided only to the receiving-side terminal device, and second data which is to be provided to the intermediary device and the receiving-side terminal device, and the providing-side terminal device generates the first encrypted data by encrypting the first data with the third public key, generates first time-authenticated data by adding to the second data a first time-stamp obtained from a time stamping authority, generates second encrypted data by encrypting the first time-authenticated data with the second public key, and transmits the first and second encrypted data to the intermediary device, and the intermediary device decrypts the second encrypted data using the second secret key.

7. An information intermediary system formed within a data distribution market-forming system and comprising:

a first terminal device that transmits transmission information;

a second terminal device that receives the transmission information; and an intermediary device that intermediates transfer of the transmission information between the first terminal device and the second terminal device, wherein the first terminal device is assigned with a first public key and a first secret key, the intermediary device is assigned with a second public key and a second secret key, and the second terminal device is assigned with a third public key and a third secret key, and the first terminal device generates first encrypted data by encrypting the transmission information with the third public key, and also generates a first electronic signature using the first secret key, and transmits the first encrypted data and the first electronic signature to the intermediary device, the intermediary device generates a second electronic signature using the second secret key, and transmits the first encrypted data, the first electronic signature, and the second electronic signature to the second terminal device, and the second terminal device decrypts the first encrypted data with the third secret key to obtain the transmission information, and also verifies the first electronic signature with the first public key and verifies the second electronic signature with the second public key, wherein the transmission information includes first data which is to be provided to the second terminal device only, and second data which is to be provided to the intermediary device, and the first terminal device generates the first encrypted data by encrypting the first data with the third public key, generates first time-authenticated data by adding to the second data a first time-stamp obtained from a time stamping authority, generates second encrypted data by encrypting the first time-authenticated data with the second public key, and transmits the first and second encrypted data to the intermediary device, and the intermediary device decrypts the second encrypted data using the second secret key.

8. The information intermediary system according to claim 7, wherein the transmission information includes a data use authorization certificate specifying as a contract rights and obligations between parties concerned with use of the data.

9. The information intermediary system according to claim 8, wherein the transmission information includes a provided data set that consists of the data use authorization certificate and provided data linked to the data use authorization certificate.

10. The information intermediary system according to claim 7, wherein

28 electronic signatures newly generated each time the transmission information is transmitted are sequentially added to the transmission information as history-indicating information.

11. The information intermediary system according to claim 7, wherein the first terminal device generates the first electronic signature by encrypting with the first secret key a hash value obtained by rendering the first encrypted data as a one-way function, and the intermediary device generates the second electronic signature by encrypting with the second secret key a hash value obtained by rendering as a one-way function a value obtained by adding the first electronic signature to the first encrypted data.

\* \* \* \* \*